US008558872B1

(12) United States Patent
Cho

(10) Patent No.: US 8,558,872 B1
(45) Date of Patent: Oct. 15, 2013

(54) APPARATUS AND METHOD FOR PROCESSING DIGITAL IMAGE

(75) Inventor: Eunhyung Cho, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 13/616,501

(22) Filed: Sep. 14, 2012

(30) Foreign Application Priority Data

Jun. 21, 2012 (WO) ................ PCT/KR2012/004921

(51) Int. Cl.
*H04N 13/00* (2006.01)
(52) U.S. Cl.
USPC .......................................................... 348/43
(58) Field of Classification Search
USPC ...................................................... 348/42–49
See application file for complete search history.

(56) References Cited

U.S. PATENT DOCUMENTS

| 6,388,654 | B1* | 5/2002 | Platzker et al. ............... 345/156 |
| 6,411,732 | B1* | 6/2002 | Saund ............................ 382/187 |
| 6,970,600 | B2 | 11/2005 | Abe |
| 7,352,902 | B2 | 4/2008 | Li et al. |
| 2002/0180726 | A1* | 12/2002 | Shi et al. ........................ 345/418 |
| 2008/0186255 | A1 | 8/2008 | Cohen et al. |
| 2009/0015553 | A1* | 1/2009 | Hirahara et al. ............... 345/158 |
| 2010/0214111 | A1 | 8/2010 | Schuler et al. |
| 2011/0083106 | A1* | 4/2011 | Hamagishi .................... 715/836 |
| 2011/0205242 | A1 | 8/2011 | Friesen |
| 2012/0249416 | A1* | 10/2012 | Maciocci et al. .............. 345/156 |
| 2012/0249544 | A1* | 10/2012 | Maciocci et al. .............. 345/419 |
| 2012/0249590 | A1* | 10/2012 | Maciocci et al. .............. 345/633 |
| 2012/0249591 | A1* | 10/2012 | Maciocci et al. .............. 345/633 |
| 2012/0249741 | A1* | 10/2012 | Maciocci et al. .............. 348/46 |
| 2012/0281092 | A1* | 11/2012 | Olivier et al. .................. 348/148 |

FOREIGN PATENT DOCUMENTS

| KR | 10-1998-029172 U | 8/1998 |
| KR | 10-1999-0078761 A | 11/1999 |
| KR | 10-1076901 B1 | 10/2011 |

OTHER PUBLICATIONS

Seo et al., "Digital Modeling of Architectural Freehand Sketch," Journal of the Architectural Institute of Korea, vol. 19, No. 11, Nov. 19, 2003, 14 pages.

* cited by examiner

*Primary Examiner* — Tung Vo
(74) *Attorney, Agent, or Firm* — Birch, Stewart, Kolasch & Birch, LLP

(57) ABSTRACT

Disclosed herein is an apparatus and method for processing a digital image, wherein analog images are converted to digital images and stored. The method for processing a digital image includes sensing a first hand-drawn sketch and storing the sensed first hand-drawn sketch as a first digital image; visualizing the stored loaded first digital image as a first virtual hand-drawn sketch; sensing a second hand-drawn sketch being additionally drawn on the visualized first virtual hand-drawn sketch; and storing the sensed second hand-drawn sketch as a second digital image, wherein the first hand-drawn sketch and the second hand-drawn sketch corresponds to a physical sketch being expressed with a liquid or solid substance hand-drawn by a user.

22 Claims, 19 Drawing Sheets

(a)

(b)

(c)

(d)

APPARATUS AND METHOD FOR PROCESSING DIGITAL IMAGE

This application claims the benefit of PCT Application No. PCT/KR2012/004921, filed on Jun. 21, 2012, which is hereby incorporated by reference as if fully set forth herein.

BACKGROUND OF THE INVENTION

1. Field of the Invention

The present invention relates to a method and apparatus for processing a digital image, wherein a hand-drawn sketch can be converted to a digital image and stored.

2. Discussion of the Related Art

With the fast growth in the supply of digital devices, users have now become capable of drawing pictures or writing texts on their digital devices with a stylus pen or their own fingers. The digital device is advantageous in that the digital device can store information, which is sensed by a touch sensor, as a digital image, and that the stored digital image has greater mobility and is more conveniently corrected as compared to a hand-drawn sketch, which is drawn by a conventional hand-drawing method.

However, despite the supply of such convenient display devices, users are still more inclined to use pens or pencils to draw hand-drawn sketches on paper notebooks or notepads. Such hand-drawing method still provides better writing quality, which cannot yet be fully provided by the recent digital devices. However, since the conventional hand-drawn sketches have disadvantages, such as being difficult to preserve and being inconvenient to carry. Therefore, the development of a method for converting hand-drawn sketches to digital images and for storing such converted digital images and a method for easily editing and correcting the stored digital image via hand-drawing is being required.

SUMMARY OF THE INVENTION

Accordingly, the present invention is directed to an apparatus and method for processing a digital image that substantially obviate one or more problems due to limitations and disadvantages of the related art.

Another object of the present invention is to provide an apparatus and method for processing a digital image that can store and edit hand-drawn sketches. Most particularly, the present invention is required to provide an apparatus and method for processing a digital image that can edit and correct the stored digital image via hand-drawing.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an embodiment of the present invention, an apparatus for processing a digital image includes an image sensor unit configured to sense a hand-drawn sketch and to convert the sensed hand-drawn sketch to a digital image, wherein the hand-drawn sketch corresponds to a physical sketch being expressed with a liquid or solid substance remaining from a hand-drawing performed by a user, an image storage unit configured to store the converted digital image, an image display unit configured to visualize the stored digital image to a virtual hand-drawn sketch, and a controller configured to control the units included in the apparatus for processing a digital image. Herein, the apparatus for processing a digital image may perform operation steps of sensing a first hand-drawn sketch and storing the sensed first hand-drawn sketch as a first digital image, loading the first digital image, thereby visualizing the loaded first digital image as a first virtual hand-drawn sketch, and sensing a second hand-drawn sketch being additionally drawn on the visualized first virtual hand-drawn sketch and storing the sensed second hand-drawn sketch as a second digital image.

Also, the apparatus for processing a digital image according to the embodiment of the present invention may further perform a step of recognizing the first hand-drawn sketch or the second hand-drawn sketch so as to visualize a virtual guide image. Herein, the virtual guide image may include an extension line image of the first hand-drawn sketch or second hand-drawn sketch or an additional image providing a 3-dimensional view of the first hand-drawn sketch or second hand-drawn sketch.

Also, in the apparatus for processing a digital image according to the embodiment of the present invention, the second digital image may overlap with the first digital image, or the second digital image may be stored in a separate layer other than that of the first digital image.

Also, in the apparatus for processing a digital image according to the embodiment of the present invention, the step of visualizing the first digital image as a first virtual hand-drawn sketch may include an operation of deciding a color, brightness, or pattern of the first virtual hand-drawn sketch, so that a background and the first virtual hand-drawn sketch can be differentiated from one another, based upon at least one of a color, a brightness, and a pattern of the background, on which the first virtual hand-drawn sketch is visualized.

Also, in the apparatus for processing a digital image according to the embodiment of the present invention, in the step of storing the second digital image, the second digital image may be scaled based upon a size of the stored first digital image, and the scaled second digital image may be stored.

Also, the apparatus for processing a digital image according to the embodiment of the present invention may further include a step of visualizing a rough sketch of an object that is to be sketched by the user.

Also, the apparatus for processing a digital image according to the embodiment of the present invention may visualize the first virtual hand-drawn sketch and the rough sketch by using a color, a brightness level, or a pattern, each being differentiated from one another.

Also, the apparatus for processing a digital image according to the embodiment of the present invention may further include an operation of recognizing the first hand-drawn sketch or the second hand-drawn sketch, thereby visualizing additional information. Herein, the additional information may include at least one of color information and pattern information corresponding to the first hand-drawn sketch or the second hand-drawn sketch and actual length information of the first hand-drawn sketch or the second hand-drawn sketch.

Also, in the apparatus for processing a digital image according to the embodiment of the present invention, when the apparatus for processing a digital image respectively stores the sensed first hand-drawn sketch and the sensed second hand-drawn sketch as the first digital image and the second digital image, the user's intention to erase a partial section of the first hand-drawn sketch or the second hand-drawn sketch may be recognized, and, even if a residue of the first hand-drawn sketch and the second hand-drawn sketch remains, the corresponding partial section may be excluded from being stored in the image storage unit.

Also, in the apparatus for processing a digital image according to the embodiment of the present invention, the user's intention to erase a partial section of the first hand-drawn sketch or the second hand-drawn sketch may be recognized by any one of a motion of covering a partial section of the first hand-drawn sketch or the second hand-drawn sketch with a liquid or solid substance, and a motion of removing a liquid or solid substance remaining from the hand-drawing of the user respective to the partial section of the first hand-drawn sketch or the second hand-drawn sketch.

Also, in the apparatus for processing a digital image according to the embodiment of the present invention, the user's intention to erase a partial section of the first hand-drawn sketch or the second hand-drawn sketch may be recognized by an Erase symbol. Herein, the Erase symbol may be additionally drawn on the partial section of the first hand-drawn sketch or the second hand-drawn sketch.

Also, in the apparatus for processing a digital image according to the embodiment of the present invention, the user's intention to erase a partial section of the first hand-drawn sketch or the second hand-drawn sketch may be recognized by any one of a motion of selecting a visualized Erase button, and a motion of selecting a partial section of the first hand-drawn sketch or the second hand-drawn sketch.

Also, in the apparatus for processing a digital image according to the embodiment of the present invention, a hand-drawn sketch being newly drawn on a partial section of the first hand-drawn sketch or the second hand-drawn sketch, after the recognition of the user's intention to erase a portion of the hand-drawn sketches, may be included as an object that is to be stored.

Also, in the apparatus for processing a digital image according to the embodiment of the present invention, in the step of storing the sensed second hand-drawn sketch as a second digital image, when a sketching characteristic of the first hand-drawn sketch is different from a sketching characteristic of the second hand-drawn sketch, the sketching characteristics of the first and second hand-drawn sketches may be changed to the same sketching characteristics and stored accordingly. Herein, the sketching characteristic may include at least one of line thickness, texture, and color.

Also, in the apparatus for processing a digital image according to the embodiment of the present invention, at least one of color indication symbols and transparency indication symbols, being marked on each section of the first hand-drawn sketch or the second hand-drawn sketch, may be recognized. And, herein, each section may be changed to have the color, line thickness, and transparency level indicated by each symbol, so that the processed hand-drawn sketch can be stored as a digital image.

Also, the apparatus for processing a digital image according to the embodiment of the present invention may further perform the steps of recognizing a coloring motion of the user performed over the first hand-drawn sketch or the second hand-drawn sketch, projecting a color designated by the coloring motion over the first hand-drawn sketch or the second hand-drawn sketch, and storing the first hand-drawn sketch or the second hand-drawn sketch along with the projected color.

Also, in the apparatus for processing a digital image according to the embodiment of the present invention, in the step of visualizing a digital image, a size of the first digital image may be first scaled, based upon a size of a visualized background, or based upon a section designated by the user over the background. Herein, the processed first digital image may be visualized as a first virtual hand-drawn sketch.

Also, in the apparatus for processing a digital image according to the embodiment of the present invention, when a position of the second hand-drawn sketch is changed, the apparatus may recognize the changed position and changes the respective position of a first virtual hand-drawn sketch, thereby visualizing the processed hand-drawn sketch.

Also, in the apparatus for processing a digital image according to the embodiment of the present invention, when the second hand-drawn sketch deviates from a sensing area of the image sensor unit within a predetermined period of time, the apparatus may further perform a step of loading the stored second digital image, so as to visualize the loaded second digital image as a second virtual hand-drawn sketch.

According to another embodiment of the present invention, a method for processing a digital image includes the steps of sensing a first hand-drawn sketch and converting and storing the sensed first hand-drawn sketch as a first digital image, loading the first digital image and visualizing the loaded first digital image as a first virtual hand-drawn sketch, and sensing a second hand-drawn sketch being additionally drawn on the visualized first virtual hand-drawn sketch and storing the sensed second hand-drawn sketch as a second digital image. Herein, the first hand-drawn sketch and the second hand-drawn sketch may correspond to a physical sketch being expressed with a liquid or solid substance remaining from a hand-drawing performed by a user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. And, the scope and spirit of the present invention will not be limited only to the exemplary embodiments presented herein.

Although the terms used in the present invention are selected from generally known and used terms, the detailed meanings of which are described in relevant parts of the description herein. It should be noted that the terms used herein may vary depending upon the intentions or general practice of anyone skilled in the art and also depending upon the advent of a novel technology. Some of the terms mentioned in the description of the present invention have been selected by the applicant at his or her discretion, terms used herein. Furthermore, it is required that the present invention is understood, not simply by the actual terms used but by the meaning of each term lying within.

In the description of the present invention, a hand-drawn sketch refers to a physical sketch created by a user via hand-drawing, which is expressed with a liquid or solid material. Herein, a hand-drawn sketch may include a design drawn with a pencil on a piece of paper, a statement hand-written on a whiteboard with a board marker, a drawing painted on a wall with spray paint, and so on. Additionally, the above-described materials, such as paper, whiteboard, wall, and so on, on which the above-described hand-drawn sketches can be drawn, may also be referred to as physical objects. A virtual hand-drawn sketch refers to a hand-drawn sketch, which is first stored as a digital image, and which is then visualized by using a projector or a Head Mount Display (HMD). For example, a virtual hand-drawn sketch may include an image projected through a projector, or an image displayed on a head mount display (HMD). Accordingly, the apparatus for processing a digital image according to the present invention may include a head mount display including a camera and a projector including an image sensor.

Figure 1:
FIG. 1 illustrates a usage example of an apparatus for processing a digital image according to an exemplary embodiment of the present invention.

FIG. 1 illustrates a usage example of an apparatus for processing a digital image according to an exemplary embodiment of the present invention. The digital image processing apparatus 10 according to the present invention may sense and store a hand-drawn sketch, which is personally hand-drawn by a user. The digital image processing apparatus 10 according to the present invention may include a projector or a head mount display (HMD). The digital image processing apparatus 10 may use an image sensor, so as to sense a hand-drawn sketch, which is expressed with a liquid or solid substance remaining on a physical object 11, such as a canvas, a notepad, or a white board. The digital image processing apparatus 10 may store the sensed hand-drawn sketch as a digital image. And, when the user wishes to sketch another drawing on a new physical object at a different time or in a different place, the digital image processing apparatus 10 may visualize the stored digital image, so as to provide a sketching environment allowing the user to continue performing his or her hand-drawn sketch starting from a point where the user has left off earlier.

More specifically, after sensing and storing a first hand-drawn sketch drawn on a physical object 11, the digital image processing apparatus 10 may visualize the stored first hand-drawn sketch on a new physical object at a different time and in a different place, as a first virtual hand-drawn sketch. As an image visualized by the digital image processing apparatus 10, the user may refer to the first virtual hand-drawn sketch in order to verify the first virtual hand-drawn sketch as the first hand-drawn sketch, which he or she had drawn earlier in the past. Then, the user may additionally hand-draw a second hand-drawn sketch, as a continuation of the verified first hand-drawn sketch.

The digital image processing apparatus 10 may then sense and store the additionally hand-drawn second hand-drawn sketch, so as to finally store both the first hand-drawn sketch and the second hand-drawn sketch. Hereinafter, the operating methods of the digital image processing apparatus in order to provide such effect will be described in detail.

Figure 2:
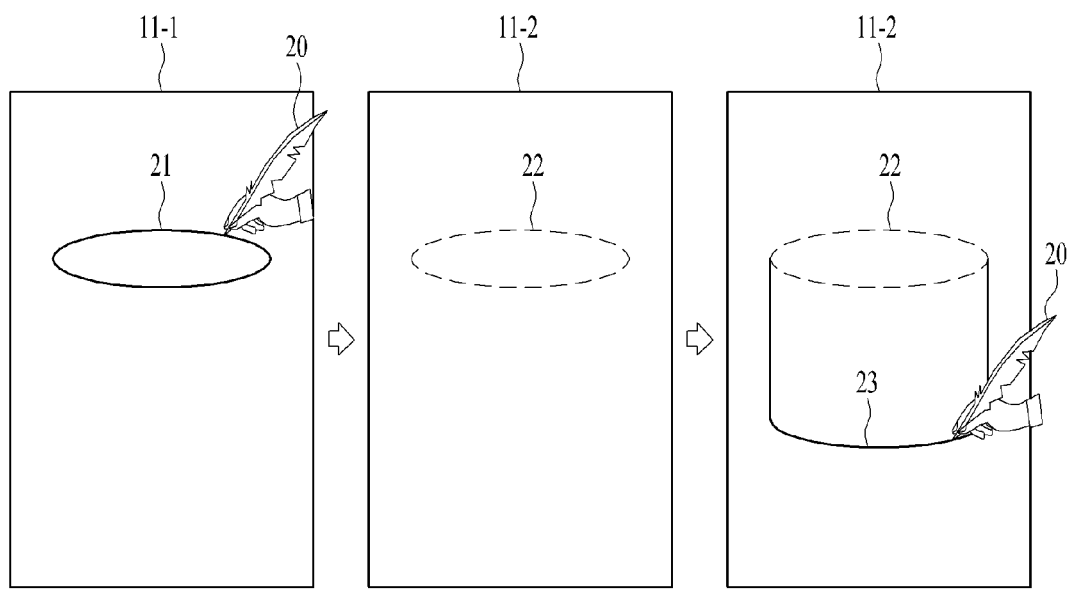
FIG. 2 illustrates a method for storing and editing a hand-drawn sketch according to an exemplary embodiment of the present invention.
Figure 2:
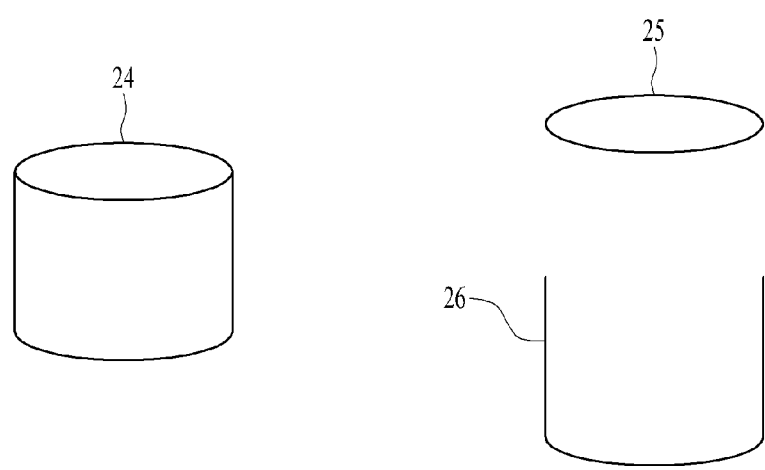

FIG. 2 illustrates a method for storing and editing a hand-drawn sketch according to an exemplary embodiment of the present invention. When the user uses a sketching tool 20 to hand-draw the first hand-drawn sketch on a physical object 11-1, the digital image processing apparatus may sense the first hand-drawn sketch and may convert the sensed first hand-drawn sketch to a digital image and store the converted digital image. The digital image processing apparatus may vary the time and place so as to visualize the stored digital image on a new physical object 11-2 as background. For example, in case of the head mound display, when the view of the user is facing the new physical object 11-2, the head mount display may use the new physical object 11-2 as background, so as to display the stored digital image on a display unit of the head mount display as a virtual hand-drawn sketch. Additionally, in case of the projector, the projector may project the stored image data on the new physical object 11-2, which is used as background, in the form of an image, thereby providing the projected image as the virtual hand-drawn sketch.

In FIG. 2, the first virtual hand-drawn sketch 22, which is presented in dotted lines, is provided by the digital image processing apparatus by having the digital image processing apparatus convert the first hand-drawn sketch 21 to a digital image, which is then stored, and visualize the stored digital image. The user may refer to the visualized first virtual hand-drawn sketch 22 so as to draw an additional second hand-drawn sketch on the new physical object 11-2. The digital image processing apparatus 10 may sense the additionally drawn second hand-drawn sketch and may store the sensed second hand-drawn sketch as a digital image.

The digital image processing apparatus may overlap with the digital image of the stored first hand-drawn sketch with the digital image of the sensed second hand-drawn sketch, so as to store a single digital image 24. Or, the digital image processing apparatus may respectively identify each hand-drawn sketch to separate layers 25 and 26, which are included in a single digital image.

Figure 3:
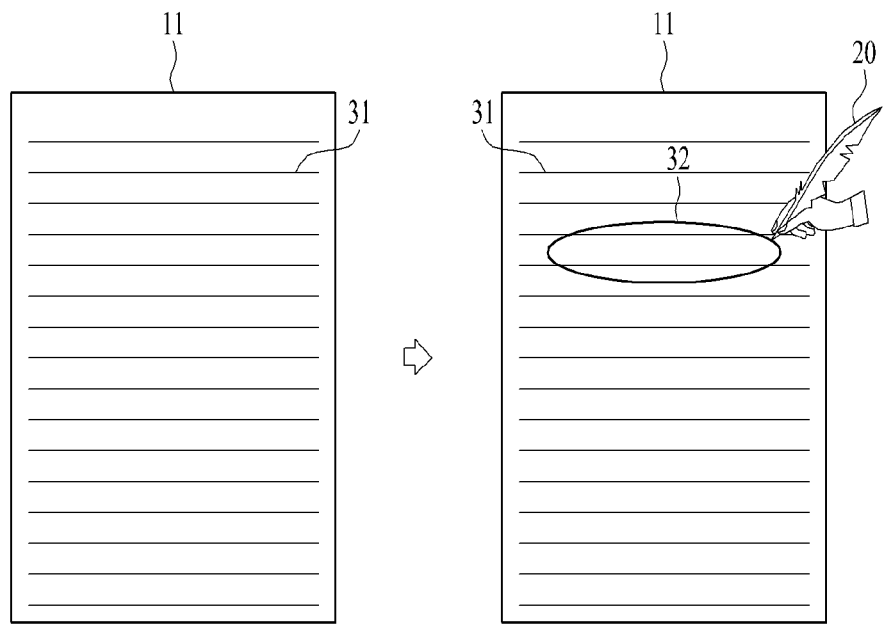
FIG. 3 illustrates a method for sensing and storing the hand-drawn sketch according to the exemplary embodiment of the present invention.
Figure 3:
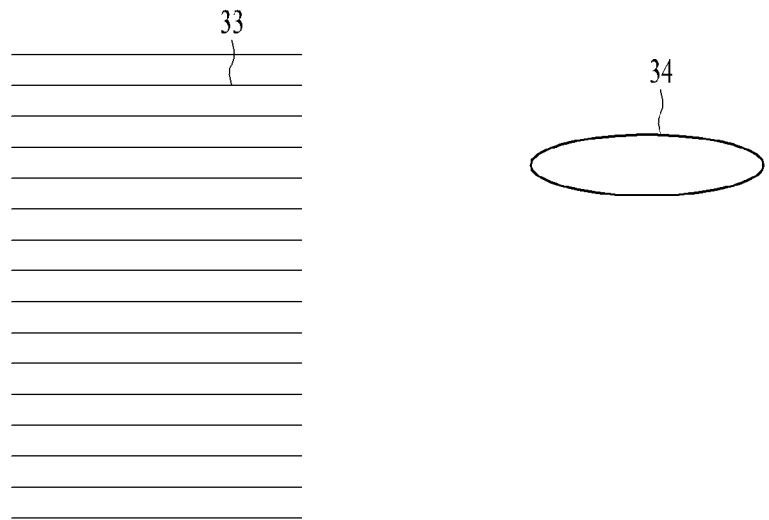

FIG. 3 illustrates a method for sensing and storing the hand-drawn sketch according to the exemplary embodiment of the present invention. The digital image processing apparatus according to the present invention may differentiate the physical object 11, on which the sketch is drawn, from the hand-drawn sketch drawn by the user. Then, the digital image processing apparatus may sense and store the differentiated hand-drawn sketch. The digital image processing apparatus may sense a physical object 11, which may be used as background before the user begins to drawn the sketch. The digital image processing apparatus may sense an image, which is printed or hand-drawn on the physical object 11. Thereafter, the digital image processing apparatus may differentiate the corresponding image from a hand-drawn sketch, which will be drawn by the user later on, and may store the differentiated image.

For example, in FIG. 3, when horizontal lines 31 exist on the physical object 11, the digital image processing apparatus may first sense the horizontal lines 31. Thereafter, when a hand-drawn sketch 32 is drawn on the physical object 11 by the user, the digital image processing apparatus may differentiate the hand-drawn sketch 32 from the horizontal lines 31, which already exist on the physical object 11, and may separately sense the hand-drawn sketch 32. More specifically, by sensing the hand-drawn sketch 32 and by excluding a horizontal line image 33, which is sensed prior to the hand-drawn sketch 32, from the generated image, the digital image processing apparatus may sense the image 34 including only the hand-drawn sketch 34.

Eventually, the digital image processing apparatus may differentiate the horizontal lines 31 on the physical object 11 from the hand-drawn sketch 32, and, then, the digital image processing apparatus may separately sense the differentiated horizontal lines 31 and hand-drawn sketch 32 and respectively store each of the separately sensed horizontal lines 31 and hand-drawn sketch 32 as a digital image 33 and 34.

Figure 4:
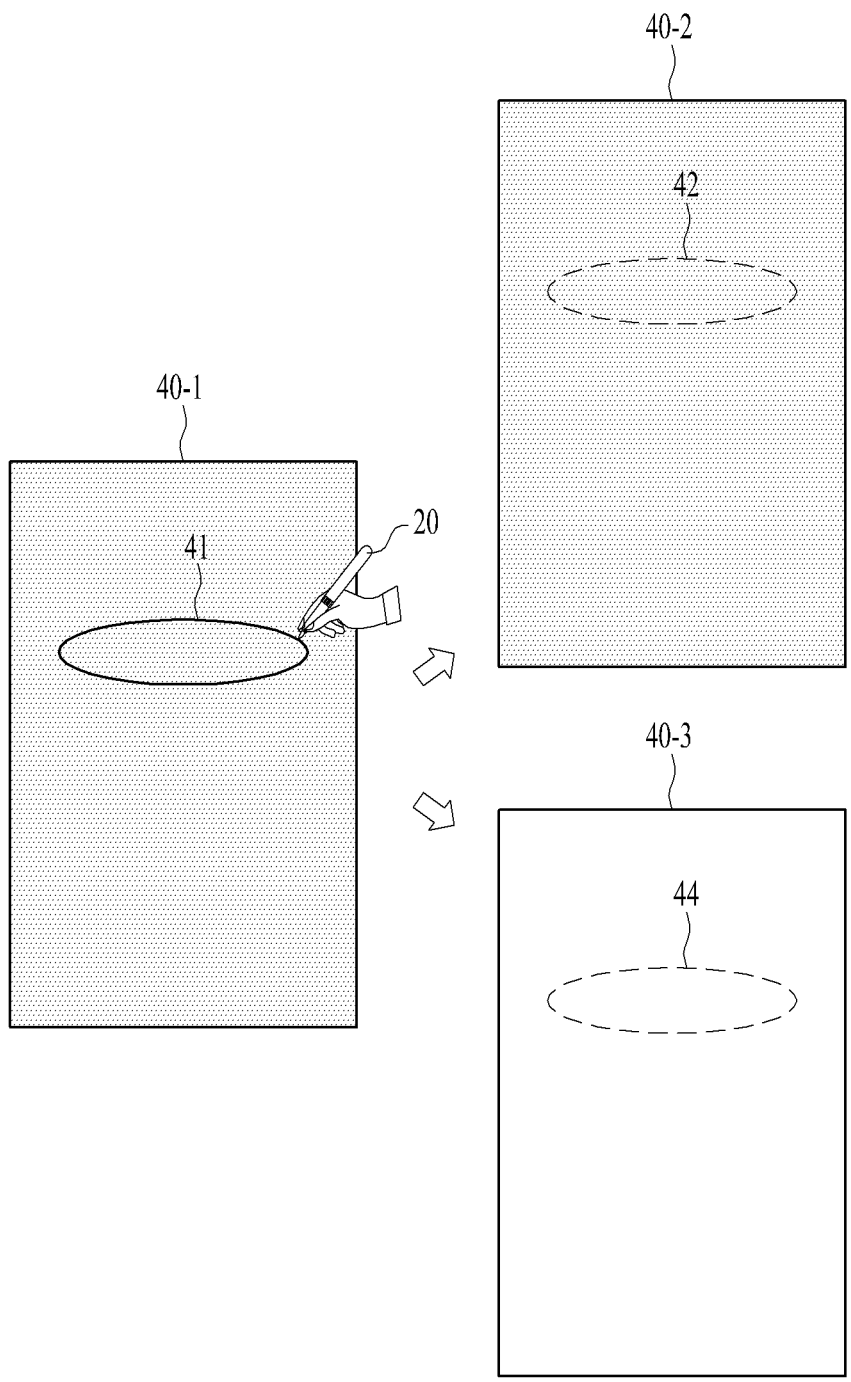
FIG. 4 illustrates a method for visualizing the hand-drawn sketch according to the exemplary embodiment of the present invention.

FIG. 4 illustrates a method for visualizing the hand-drawn sketch according to the exemplary embodiment of the present invention. The digital image processing apparatus may sense and store a hand-drawn sketch and visualize the corresponding hand-drawn sketch at a wanted time and place. In storing the hand-drawn sketch, the digital image processing apparatus may store at least one of a color, a brightness level, and a pattern of the hand-drawn sketch along with the corresponding hand-drawn sketch. In visualizing the hand-drawn sketch, the digital image processing apparatus may compare the color, brightness level, or pattern of the stored hand-drawn sketch with the color, brightness level, or pattern of a physical object, which is located on a visualized background, so as to decide the color, brightness level, or pattern of a visualized virtual hand-drawn sketch. Depending upon the background on which the virtual hand-drawn sketch is being visualized, the digital image processing apparatus may decide a color, brightness level, or pattern that may increase visibility of the virtual hand-drawn sketch.

Referring to FIG. 4, for example, in case of the color, the digital image processing apparatus may sense a hand-drawn sketch 41 drawn with a sketching tool 20, which corresponds to a white marker, on a gray physical object 40-1. Herein, the digital image processing apparatus may store the color information along with the sensed hand-drawn sketch. And, in this case, the color information corresponds to the color white.

In visualizing the digital image of a stored hand-drawn sketch, when a grey physical object 40-2 exists in a visualization background, the virtual hand-drawn sketch 42 may be visualized by using the color white, which corresponds to the color information. Alternatively, when a white physical object 40-3 exists in the visualization background, in order to increase the visibility, the digital image processing apparatus may visualize the virtual hand-drawn sketch 44 by using the color black. More specifically, depending upon the color of a visualization background, the digital image processing apparatus may visualize a virtual hand-drawn sketch by using a color, which provides high visibility. And, in order to do so, the digital image processing apparatus may use a complementary color contrast effect.

Referring to FIG. 4, although the present invention has been described above with respect to the color, by deciding the brightness level and pattern of a virtual hand-drawn sketch with respect to the brightness level and pattern of the visualization background, the digital image processing apparatus according to the present invention may enhance the visibility of the virtual hand-drawn sketch.

Figure 5:
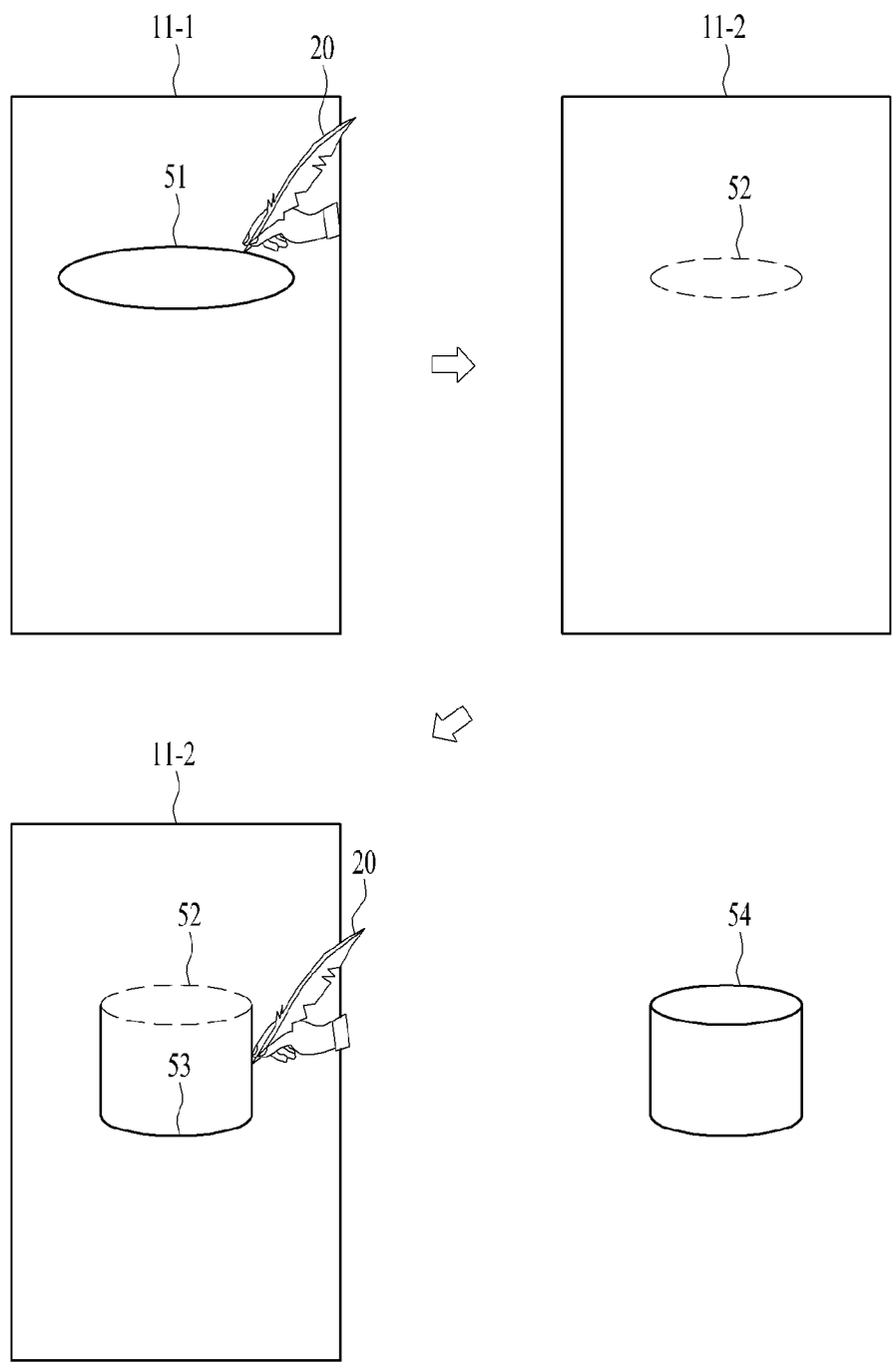
FIG. 5 illustrates a method for scaling a size of the hand-drawn sketch and providing the scaled size of the hand-drawn sketch according to the exemplary embodiment of the present invention.

FIG. 5 illustrates a method for scaling a size of the hand-drawn sketch and providing the scaled size of the hand-drawn sketch according to the exemplary embodiment of the present invention. The digital image processing apparatus may sense a first hand-drawn sketch 51, which is hand-drawn on a physical object 11-1 by using a sketching tool 20, and may store the sensed first hand-drawn sketch 51 as a first digital image. In case the user visualizes the stored first digital image by varying the time and place and by using another physical object 11-2 as the background, the digital image processing apparatus may scale the size of the first digital image, so as to visualize the first data image as a first virtual hand-drawn sketch 52.

The user may draw a second hand-drawn sketch 53 as a continuation of the first virtual hand-drawn sketch 52. The digital image processing apparatus may sense the additionally drawn second hand-drawn sketch 53 and may store the sensed second hand-drawn sketch 53 as a second digital image. Since the second digital image has been drawn with respect to the size of the scaled first virtual hand-drawn sketch 52, the size of the initially stored first digital image may differ from the size of the second digital image. In storing the second digital image, the digital image processing apparatus may scale the size of the initially stored first digital image with reference to the size of the second digital image. Then, the digital image processing apparatus may store the first digital image and the second digital image at the same magnification. Additionally, according to another embodiment of the present invention, the digital image processing apparatus may scale the size of the second digital image based upon the size of the first digital image, thereby storing the first digital image and the second digital image at the same magnification. As a result, although the magnification of the actually sketched first hand-drawn sketch 51 is different from the magnification of the second hand-drawn sketch 53, each of the first digital image and the second digital image may be stored at the same magnification, or the first hand-drawn sketch 51 and the second hand-drawn sketch 53 may be stored as a single digital image 54 having the same magnification applied thereto.

Figure 6:
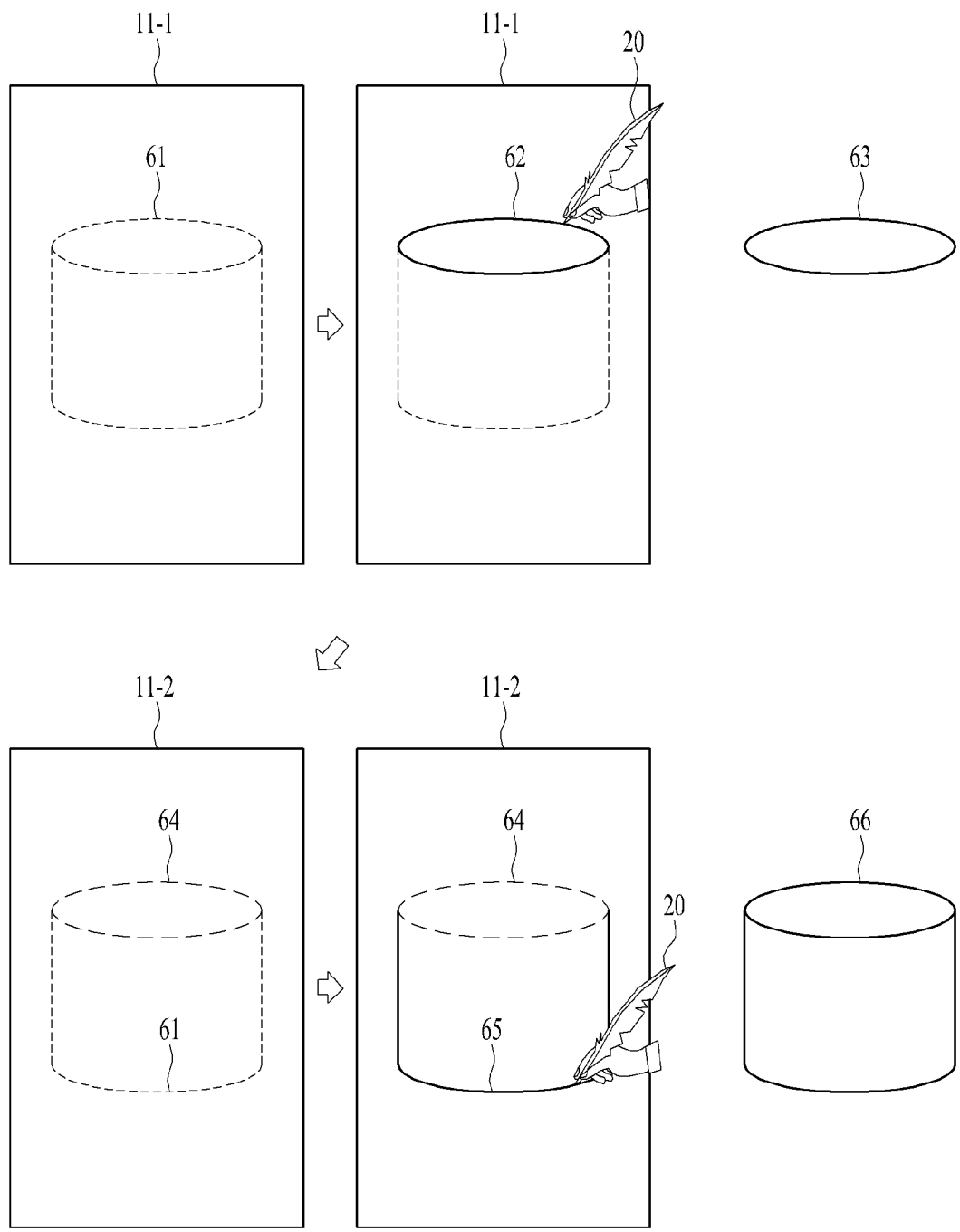
FIG. 6 illustrates a method for visualizing a rough sketch of the hand-drawn sketch according to the exemplary embodiment of the present invention.

FIG. 6 illustrates a method for visualizing a rough sketch of the hand-drawn sketch according to the exemplary embodiment of the present invention. The digital image processing apparatus according to the present invention may visualize a sketching object selected by the user in the form of a rough sketch and may provide the visualized rough sketch of the sketching object. Depending upon the user's selection, the digital image processing apparatus may load the rough sketch of the sketching object from an internal storage unit, an external storage unit, or a web storage unit, so as to visualize the rough sketch.

The digital image processing apparatus may visualize the rough sketch 61 of the sketching object by using a physical object 11-1 as the background. In visualizing the rough sketch 61, the digital image processing apparatus may visualize the rough sketch by using a color, brightness level, or pattern that is different from that of the virtual hand-drawn sketch, so that the laser can differentiate the virtual hand-drawn sketch from the rough sketch.

The user may use the sketching tool 20 so as to draw a first hand-drawn sketch by tracing the visualized rough sketch 61. The digital image processing apparatus may selectively sense only the first hand-drawn sketch 62 excluding the visualized rough sketch 61 and may then store the selectively sensed first hand-drawn sketch 62 as a first digital image 63.

When the user varies the time or place, in order to visualize the stored first digital image 63 on another physical object 11-2, which is used as the background, the digital image processing apparatus may visualize the first digital image as a first virtual hand-drawn sketch 64. Additionally, the digital image processing apparatus may also re-visualize the rough sketch 61, which has been previously visualized. In this case, each of the first virtual hand-drawn sketch 64 and the rough sketch 61 may be visualized by using different colors, brightness levels, or patterns.

Accordingly, the user may be capable of identifying which area corresponds to the visualized first virtual hand-drawn sketch 64 and which area corresponds to the visualized rough sketch 61. Moreover, by preventing the rough sketch 61 from being visualized in the area where the first virtual hand-drawn sketch is visualized, the digital image processing apparatus may clearly visualize each area, thereby enhancing the user's convenience.

As a continuation of the first virtual hand-drawn sketch 64, the user may trace over the visualized rough sketch 61, so as to draw a second hand-drawn sketch 65. The digital image processing apparatus may then sense the additionally drawn second hand-drawn sketch 65 and store the sensed second hand-drawn sketch 65 as a second digital image. Herein, the initially stored first digital image may be integrated with the second digital image. And, then, the digital image processing apparatus may store the integrated image as a single digital image 66.

Figure 7:
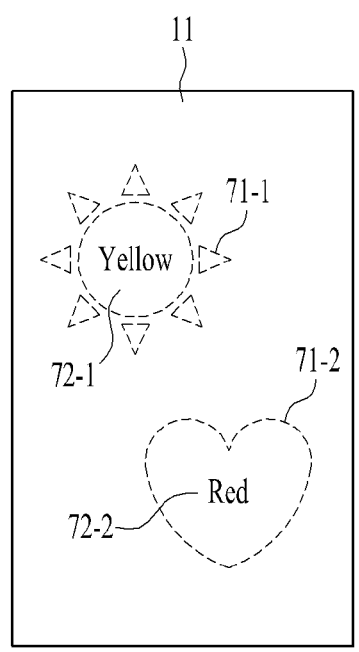
FIG. 7 illustrates a method for providing additional information on the hand-drawn sketch according to the exemplary embodiment of the present invention.
Figure 7:
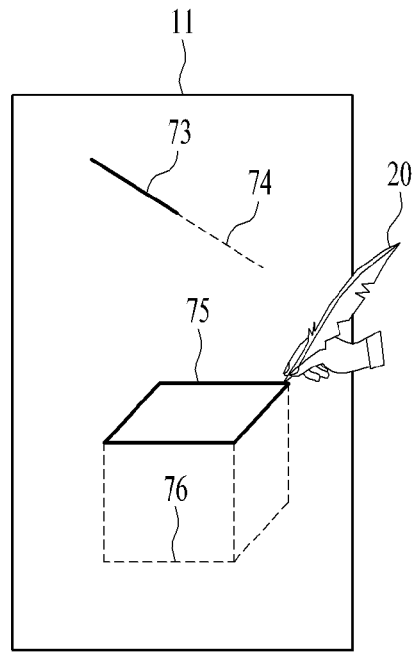
Figure 7:
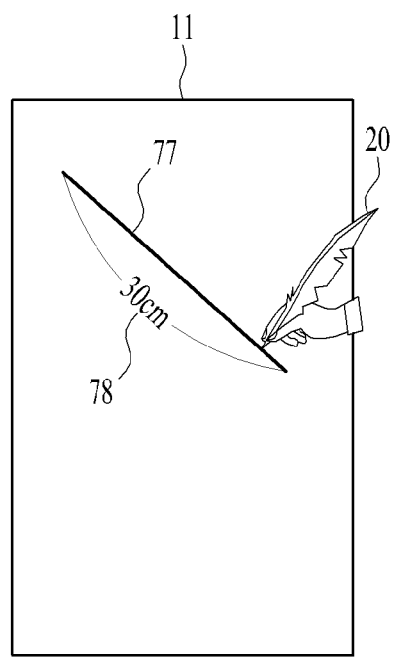
Figure 7:
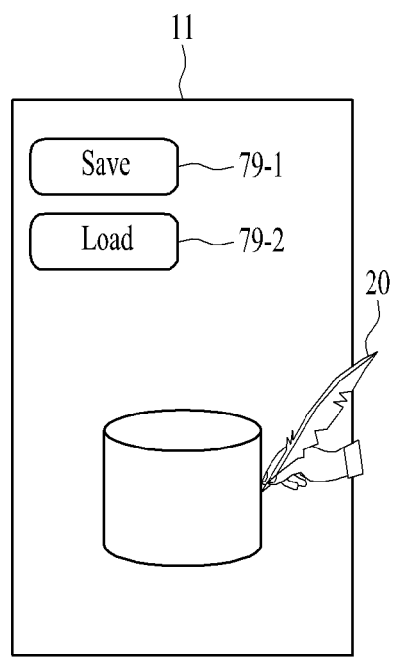

FIG. 7 illustrates a method for providing additional information on the hand-drawn sketch according to the exemplary embodiment of the present invention. FIG. 7A illustrates an example of providing color information as additional information respective to the hand-drawn sketch. The digital image processing apparatus may recognize a rough sketch, which is selected by the user, and may additionally visualize the color information respective to the corresponding rough sketch. The digital image processing apparatus according to another embodiment of the present invention may recognize the hand-drawn sketch, which is drawn by the user, and may additionally visualize color information respective to the corresponding hand-drawn sketch. The color information may be visualized in a text form respective to the corresponding color, or the color information may be visualized by displaying the corresponding color in a specific area. Furthermore, the digital image processing apparatus may further include pattern information along with the color information by using the above-described method.

For example, when the user selects a sun and a heart as the sketching object, the digital image processing apparatus may respectively visualize rough sketches 71-1 and 71-2 of the sun and the heart. The digital image processing apparatus may recognize the visualized rough sketches 71-1 and 71-2 of the sun and the heart and may respectively visualize the colors yellow and red in text forms Yellow 72-1 and Red 72-2. Additionally, as described above, the digital image processing apparatus may display the color yellow over the rough sketch 71-1 of the sun, and the digital image processing apparatus may display the color red over the rough sketch 71-2 of the heart, so as to visualize the respective colors of the corresponding shapes.

Instead of recognizing the above-described rough sketches, the digital image processing apparatus according to another embodiment of the present invention may also recognize the hand-drawn sketches personally hand-drawn by the user, so as to visualize the color information.

FIG. 7B illustrates a method for providing a virtual guide image as additional information on the hand-drawn sketch. The digital image processing apparatus may recognize the hand-drawn sketch of the user so as to visualize the virtual guide image. Herein, the virtual guide image refers to an image that allows the user to easily complete his sketch. Herein, the virtual guide image may include an extension line image of the hand-drawn sketch and an additional image providing a 3-dimensional view of the hand-drawn sketch.

For example, when the user draws a hand-drawn sketch 73 including a straight line on a physical object 11, the digital image processing apparatus may recognize the corresponding hand-drawn sketch 73 and may visualize an extension line 74 of the straight line. Additionally, when the user draws a hand-drawn sketch 75 including a parallelogram, the digital image processing apparatus may recognize the parallelogram as the top surface of a cubic square and may visualize remaining portions configuring the cubic square. More specifically, the digital image processing apparatus may visualize the extension line 74 of the straight line and the remaining portions 76 for completing the cubic square as the virtual guide image.

As described above, by providing a virtual guide image, which is configured to provide guidance to the user when creating his hand-drawing sketch, the digital image processing apparatus may enhance the user's convenience.

FIG. 7C illustrates a method for providing actual length information of a hand-drawn sketch as additional information respective to the hand-drawn sketch. The digital image processing apparatus may recognize the hand-drawn sketch drawn by the user and may provide actual length information. The actual length information may be calculated from a distance between a physical object, on which the hand-drawn sketch is drawn, and the digital image processing apparatus and from a length of the sensed hand-drawn sketch within the digital image. The digital image processing apparatus may visualize the actual length information of each of the segments included in the hand-drawn sketch and may provide the visualized actual length information.

For example, the digital image processing apparatus may measure the distance between the digital image processing apparatus and the physical object 11, on which the hand-drawn sketch 77 is drawn, and may sense the hand-drawn sketch 77 as a digital image, thereby being capable of calculating an actual length of the hand-drawn sketch 77. If the calculated length information is equal to 30 centimeters (cm), the digital image processing apparatus may visualize '30 cm' along with an auxiliary line respective to the hand-drawn sketch 77, thereby marking the length of the segment, which is drawn by the user. Accordingly, the user may be capable of knowing the actual length information of the hand-drawn sketch, which he is drawing, through the digital image processing apparatus without being required to carry a separate measuring tool.

FIG. 7D illustrates a method for saving and loading a hand-drawn sketch. The digital image processing apparatus may visualize and provide a Save button 79-1 and a Load button 79-2 on a physical object 11, which is used as the background. The digital image processing apparatus may recognize a touching motion of the user touching the area in which the corresponding buttons are visualized. When the Save button 79-1 is recognized to be touched, the digital image processing apparatus may sense the hand-drawn sketch and store the sensed hand-drawn sketch at the corresponding time point. Additionally, when the Load button 79-2 is recognized to be touched, the digital image processing apparatus may visualize the stored digital image in the form of a virtual hand-drawn sketch. Accordingly, the user may operate the digital image processing apparatus by using the buttons, which are visualized on the physical object 11, without having to personally control the digital image processing apparatus.

Figure 8:
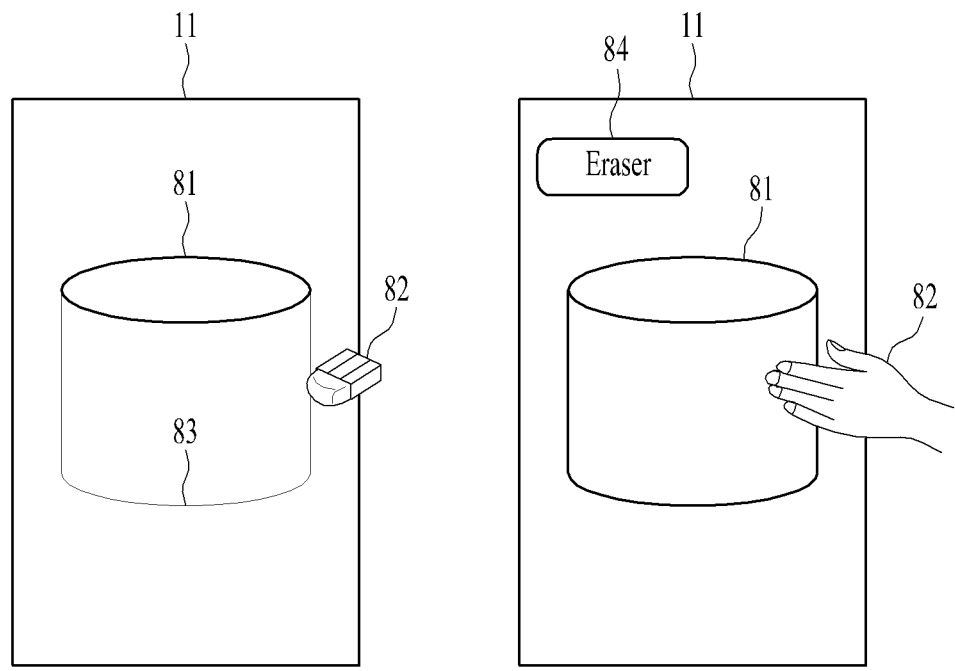
FIG. 8 illustrates a method for erasing the hand-drawn sketch according to the exemplary embodiment of the present invention.
Figure 8:
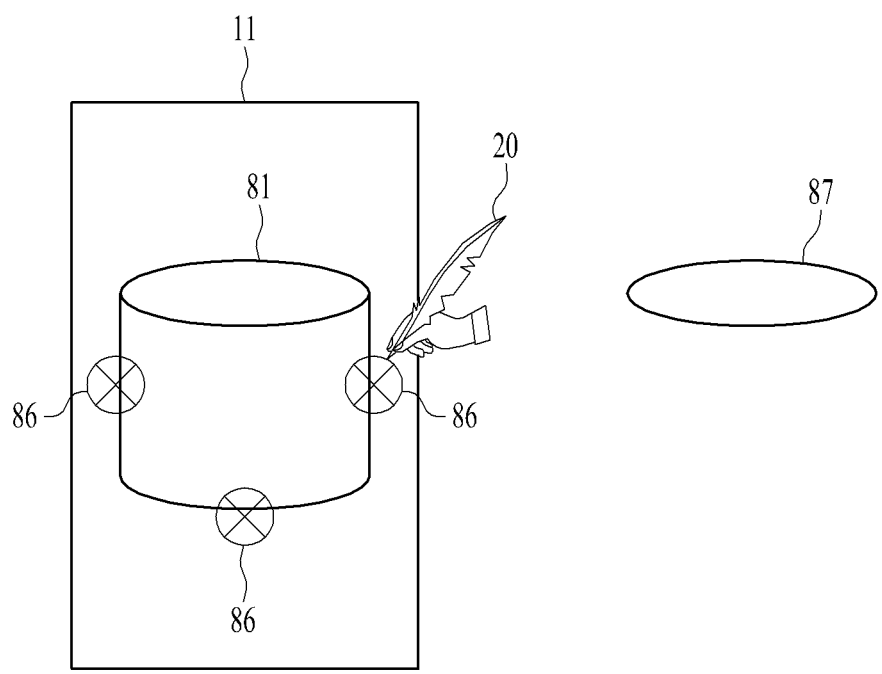

FIG. 8 illustrates a method for erasing the hand-drawn sketch according to the exemplary embodiment of the present invention. The digital image processing apparatus according to the present invention may recognize the user's intention to erase a partial area of the hand-drawn sketch. And, even if a portion of the hand-drawn sketch remains with respect to the corresponding area, the partial area that is intended to be erased by the user may be excluded from the storage object. Herein, the user's intention to perform erasure may be recognized by the process step of covering a partial area of the hand-drawn sketch with a liquid or solid substance, or by the process step of removing the liquid or solid substance, which remains from the hand-drawing of the user, from the partial area of the hand-drawn sketch.

For example, the digital image processing apparatus may recognize covering a portion of the hand-drawn sketch by using a correction fluid, a correction tape, and so on, or erasing a portion of the hand-drawn sketch by using an eraser as the user's intention to perform erasure. During this process, in a hand-drawn sketch covered with correction when a portion of the corresponding hand-drawn sketch is exposed, or, in a hand-drawn sketch that is erased with an eraser, when a partial trace or a residue of the hand-drawn sketch remains, the digital image processing apparatus may exclude such exposed and/or remaining portions (residue) from being stored, even if the digital image processing apparatus has sensed the corresponding portions.

More specifically, referring to FIG. 8, in a hand-drawn sketch of a cylindrical figure, when side surfaces 83 of the hand-drawn sketch are erased by the eraser 82 with the exception for a top surface 81 of the hand-drawn sketch, even if faint traces of the erased portions remain, the digital image processing apparatus may store the remaining (i.e., non-erased) portions of the hand-drawn sketch excluding the erased portion of the hand-drawn sketch. Herein, the stored digital image 87 may include only the top surface of the cylindrical figure.

According to another embodiment of the present invention, the digital image processing apparatus may acknowledge the user's motion of first touching the visualized Erase button 84 and then touching the hand-drawn sketch 81 and recognize the user's intention to erase the selected hand-drawn sketch 81. By excluding a partial area of the hand-drawn sketch, which is covered by the user's hand after having touched the Erase button 84, from the storage range, the digital image processing apparatus may reflect the user's intention to erase the corresponding partial area on the digital image that is being stored. In FIG. 8, if the user has first touched the Erase button 84 and has then touched segments of the hand-drawn sketch indicating side surfaces and a bottom surface, the digital image 87, which is stored by the digital image processing apparatus, may include only the top surface. This operation method will be described in more detail later on with reference to FIG. 9.

According to yet another embodiment of the present invention, the digital image processing apparatus may recognize the user's intention to erase a portion of the hand-drawn sketch by identifying an Erase symbol 86, which is additionally drawn over a partial area of the hand-drawn sketch 81. The Erase symbol corresponds to one of multiple pre-defined symbols that can be recognized by the digital image processing apparatus. And, herein, the Erase symbol is drawn by using a sketching tool 20 just as the hand-drawn sketch.

In case the digital image processing apparatus senses the Erase symbol, which is additionally drawn over the hand-drawn sketch, the digital image processing apparatus may recognize the Erase symbol as the user's intention to erase a portion of the hand-drawn sketch. By excluding a partial area of the hand-drawn sketch, on which the Erase symbol is drawn, from the storage range, the digital image processing apparatus may reflect the user's intention to erase the corresponding partial area on the digital image that is being stored. Referring to FIG. 8, when the user has drawn the Erase symbol 86 over segments indicating the side surfaces and the bottom surface of the hand-drawn sketch, the digital image 87, which is stored by the digital image processing apparatus, may include only the top surface. This operation method will be described in more detail later on with reference to FIG. 9.

Figure 9:
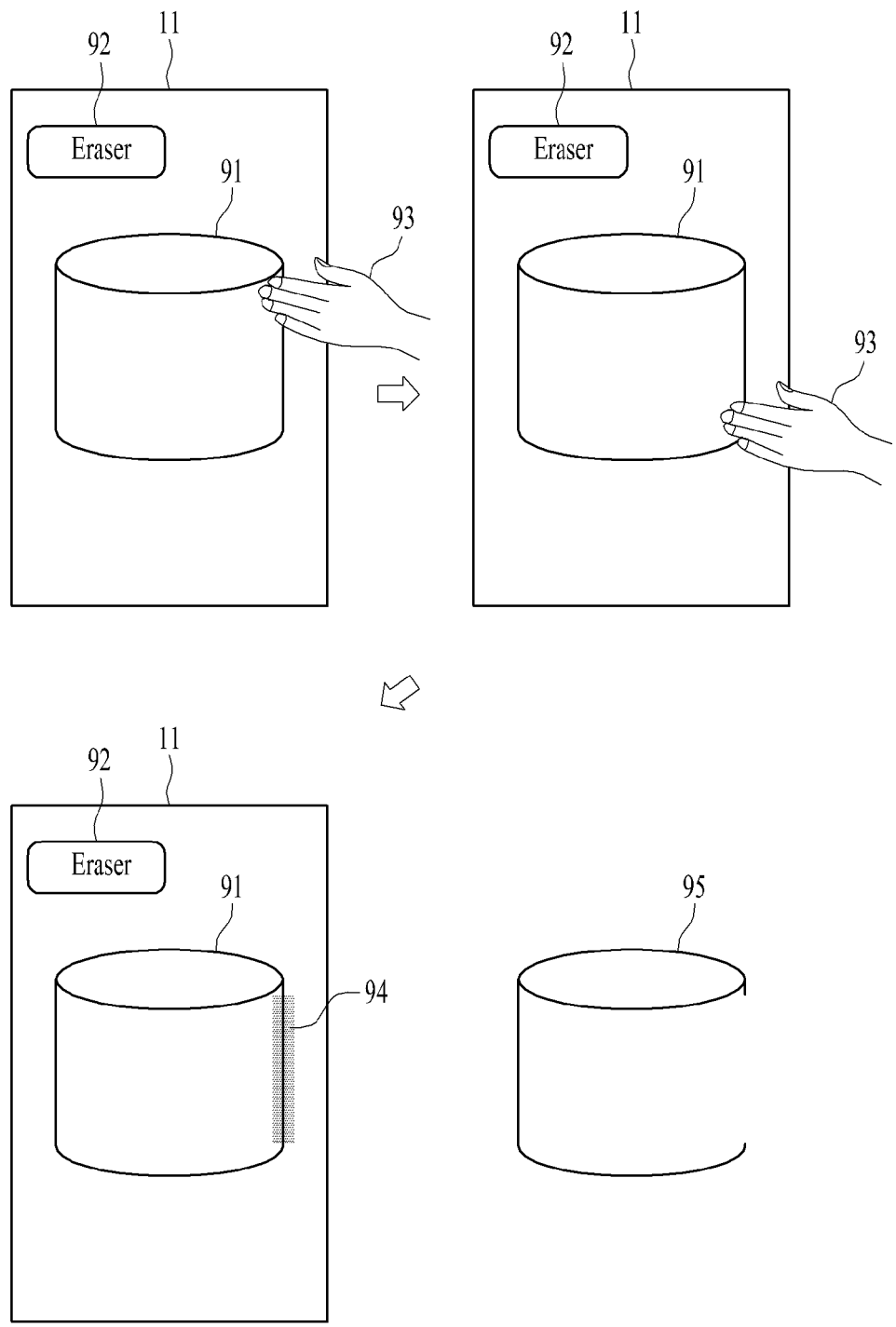
FIG. 9 illustrates a method for erasing the hand-drawn sketch by using an Erase button according to the exemplary embodiment of the present invention.

FIG. 9 illustrates a method for erasing the hand-drawn sketch by using an Erase button according to the exemplary embodiment of the present invention. By sensing the user's continuous operating motions of selecting a visualized Erase button and selecting a partial area of the hand-drawn sketch, the digital image processing apparatus may recognize the user's intention to erase a partial area of the hand-drawn sketch.

For example, when the user first touches the Erase button 91, which is visualized on a physical object 11 being used as background, and when the user touches a segment indicating a right side surface of the hand-drawn sketch 91 by sliding the user's hand 93 along an up-to-down direction, the digital image processing apparatus may exclude an area 94 of the hand-drawn sketch, which is covered by the user's hand 93, from the storage range. More specifically, it may appear that the partial area of the hand-drawn sketch, which is covered by the user's hand 93, is being erased. As a result, the digital image processing apparatus may store a digital image 95 having the segment indicating the right side surface of the hand-drawn sketch erased from the overall hand-drawn sketch.

Accordingly, a partial area of the hand-drawn sketch may be erased by using the Erase button, which is visualized on the physical object 11 being used as the background, and by using the user's hand, without requiring the user to use a physical eraser or correction fluid. Thus, the digital image processing apparatus may store the corresponding processed hand-drawn sketch as a digital image.

Figure 10:
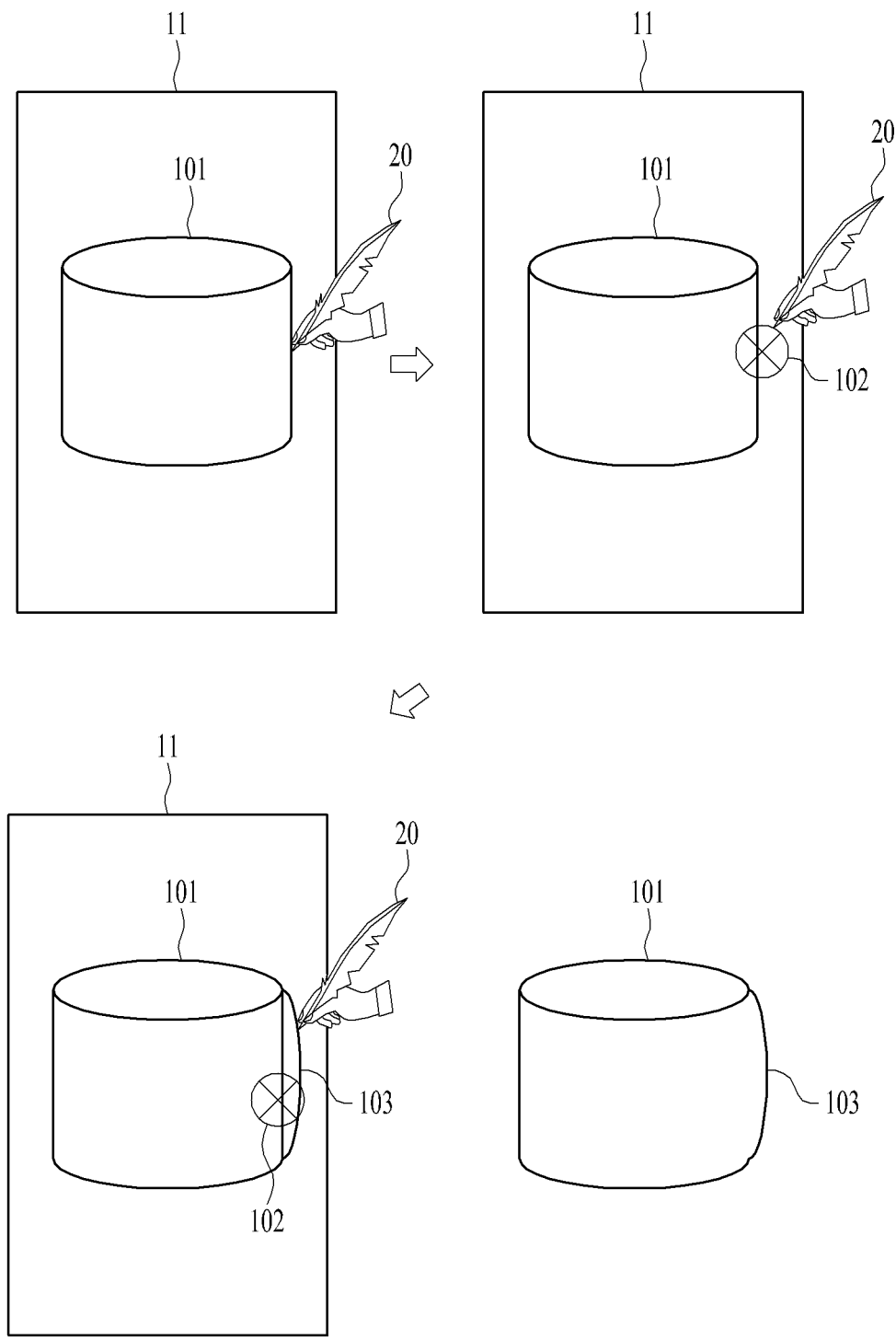
FIG. 10 illustrates a method for erasing the hand-drawn sketch by using an Erase symbol according to the exemplary embodiment of the present invention.

FIG. 10 illustrates a method for erasing the hand-drawn sketch by using an Erase symbol according to the exemplary embodiment of the present invention. The digital image processing apparatus may identify the Erase symbol, which is additionally drawn over a partial area of the hand-drawn sketch, so as to recognize the user's intention to erase a portion of the hand-drawn sketch. Accordingly, the digital image processing apparatus may exclude the portion of the hand-drawn sketch, on which the Erase symbol exists, from the storage range.

Additionally, the digital image processing apparatus may memorize the hand-drawn sketch and time information corresponding to a time point at which the Erase symbol is drawn. Accordingly, the digital image processing apparatus may not apply the corresponding Erase symbol to a hand-drawn sketch, which is drawn after the drawing of the Erase symbol. More specifically, the digital image processing apparatus may apply the corresponding Erase symbol only to the hand-drawn sketch, which is drawn before the drawing of the Erase symbol, and the digital image processing apparatus may not apply the corresponding Erase symbol to the hand-drawn sketch that is drawn after the drawing of the Erase symbol. Then, after having recognized the user's intention to erase a portion of the hand-drawn sketch by identifying the Erase symbol, the digital image processing apparatus may include a hand-drawn sketch, which is newly drawn on the area having the corresponding Erase symbol drawn thereon, after the drawing of the Erase symbol, in the storage range.

For example, when the user draws the Erase symbol 102 on a partial area of a hand-draw sketch 101, after the user has drawn the hand-drawn sketch 101 on a physical object 11 by using a sketching tool 20, a segment being located in the partial area of the hand-drawn sketch, on which the corresponding Erase symbol exists, may be excluded from the storage range. More specifically, the digital image processing apparatus may erase a portion of the hand-drawn sketch, which exists in an area selected by the Erase symbol 102. Additionally, as for the hand-drawn sketch 103 that is drawn after the drawing of the Erase symbol, even if the newly drawn hand-drawn sketch exists in the area selected by the Erase symbol, the digital image processing apparatus may include the corresponding hand-drawn sketch 103 in the storage range. As a result, the digital image that is stored in the digital image processing apparatus may correspond to a digital image, which is configured by integrating the hand-drawn sketch 101 having a partial area erased with the newly added hand-drawn sketch 103.

Accordingly, even if the user does not use a physical eraser or correction fluid, by sensing the Erase symbol 102 drawn over the hand-drawn sketch 101, which is drawn on the physical object 11, the digital image processing apparatus may erase a partial area of the hand-drawn sketch 101 and may, then, add a new hand-drawn sketch 103, so as to store the corrected hand-drawn sketch as the digital image.

Figure 11:
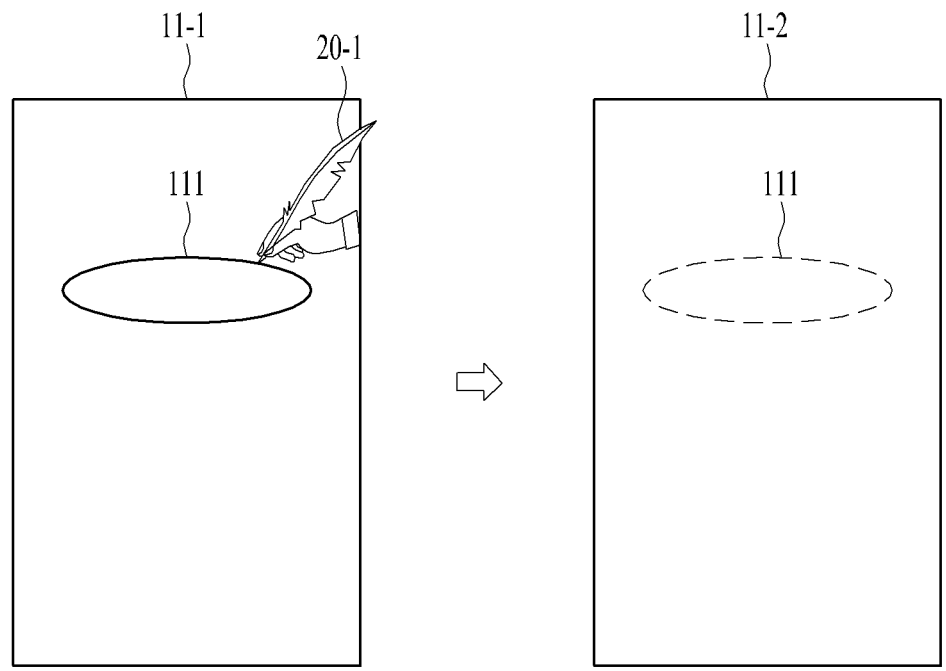
FIG. 11 illustrates a method for equally storing attributes of multiple hand-drawn sketches according to the exemplary embodiment of the present invention.
Figure 11:
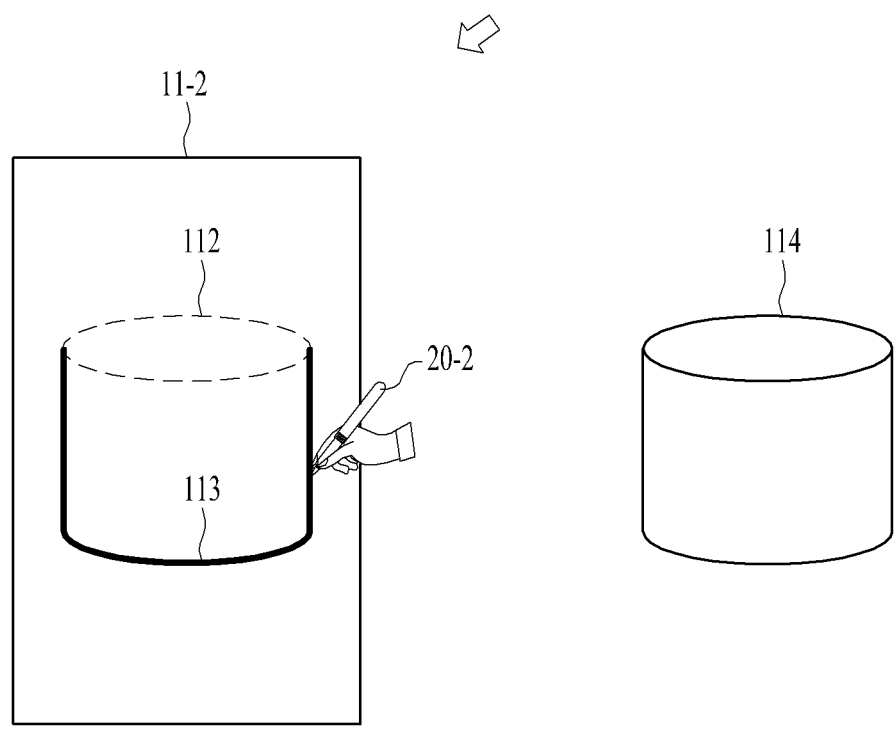

FIG. 11 illustrates a method for equally storing attributes of multiple hand-drawn sketches according to the exemplary embodiment of the present invention. When a first hand-drawn sketch and a second hand-drawn sketch each having different sketch characteristics co-exist, the digital image processing apparatus may convert the separate sketch characteristics of each of the first hand-drawn sketch and the second hand-drawn sketch to a common sketch characteristic. Herein, the sketch characteristic may include at least one of a line thickness, a texture, and a color.

The digital image processing apparatus according to the present invention may sense a first hand-drawn sketch 111, which is drawn on a physical object 11-1 by using a sketching tool 20-1 and may, then, store the sensed first hand-drawn sketch 111 as a first digital image. When the user varies the time or place so as to visualize the stored first digital image on another physical object 11-2, the digital image processing apparatus may display a first virtual hand-drawn sketch 112.

In continuation of the first virtual hand-drawn sketch 112, the user may draw a second hand-drawn sketch 113. Since the user draws the second hand-drawn sketch 113 as a continuation of the first hand-drawn sketch 111, which corresponds to an incomplete sketch, the characteristics of the sketch may be consistently maintained. In this case, if the user possesses only a second sketching tool 20-2, which is different from the first sketching tool 20-1, it may be difficult to maintain consistent characteristics within a single sketch. This is because at least one of the line thickness, texture, and color of the second hand-drawn sketch 113 is different from at least one of the line thickness, texture, and color of the first hand-drawn sketch 111.

In order to resolve such disadvantage, the digital image processing apparatus may sense the additionally drawn second hand-drawn sketch 113 and may store the sensed second hand-drawn sketch 113 as a second digital image. Although the second digital image corresponds to a continued sketch of the first virtual hand-drawn sketch 112, depending upon the second sketching tool 20-2, the sketching characteristics of the second digital image may be different from those of the first virtual hand-drawn sketch 112. In storing the second digital image, the digital image processing apparatus may convert the sketching characteristics of the first digital image, which has already been stored, based upon the sketching characteristics of the second digital image, so that the first digital image and the second digital image can be stored to have the same sketching characteristics. Additionally, according to another embodiment of the present invention, the digital image processing apparatus may also convert the sketching characteristics of the second digital image based upon the sketching characteristics of the first digital image, so that the first digital image and the second digital image can be stored to have the same sketching characteristics. As a result, although the first hand-drawn sketch 111 and the second hand-drawn sketch 113, which have actually been sketched by the user, have different sketching characteristics, each of the stored first digital image and the stored second digital image may be stored to have the same sketching characteristics. And, alternatively, the first digital image and the second digital image may also be stored as a single digital image 114 having the same sketching characteristics applied thereto.

Figure 12:
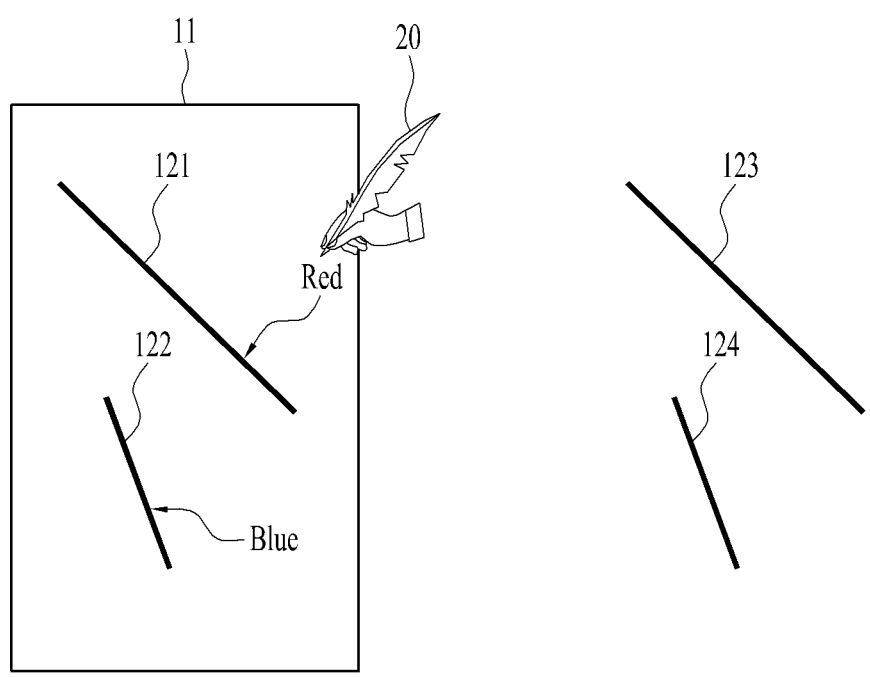
FIG. 12 illustrates a method for designating colors of the hand-drawn sketch according to the exemplary embodiment of the present invention.

FIG. 12 illustrates a method for designating colors of the hand-drawn sketch according to the exemplary embodiment of the present invention. The digital image processing apparatus according to the present invention may recognize color indication symbols designated by the user with respect to each section of the hand-drawn sketch. Then, the digital image processing apparatus may change each section of the hand-drawn sketch to the colors designated to each of the sections by the color indication symbols, so as to store the processed hand-drawn sketch to a digital image. The color indication symbol corresponds to a predefined symbol, which is configured to be recognized by the digital image processing apparatus. And, just as the hand-drawn sketch, the color indication symbol may also be drawn by a sketching tool 20.

For example, after drawing a hand-drawn sketch including two segments on a physical object 11, the user may insert the term Red for a color indication symbol respective to a first segment 121, and the user may insert the term Blue for a color indication symbol respective to a second segment 122. Accordingly, in sensing the hand-drawn sketch and storing the sensed hand-drawn sketch as a digital image, the digital image processing apparatus may change the color of the first segment 121 to the color red, and the digital image processing apparatus may change the color of the second segment 122 to the color blue, thereby storing each of the respective digital image 123 and 124. More specifically, the digital image processing apparatus may store each of the digital images 123 and 124 to the color designated by the user by using the respective color indication symbols, instead of the original colors of the hand-drawn sketches 121 and 122. In storing the sensed hand-drawn sketch, the digital image processing apparatus may exclude the color indication symbol and texts or signs designating specific colors from the range of objects that are to be stored.

Accordingly, even if the user does not possess any coloring tools, the user may use the digital image processing apparatus to designate a color respective to each section of the hand-drawn sketch. Then, the digital image processing apparatus may change the hand-drawn sketch, so as to store the processed hand-drawn sketch as a digital image being colored with the designated color.

Additionally, in addition to the color indication symbol, the digital image processing apparatus according to the present invention may also recognize line thickness indication symbols designated by the user with respect to each section of the hand-drawn sketch. Then, the digital image processing apparatus may change each section of the hand-drawn sketch to the line thickness indicated by the line thickness indication symbols, so as to store the processed hand-drawn sketch to a digital image. The line thickness indication symbol corresponds to a predefined symbol, which is configured to be recognized by the digital image processing apparatus. And, just as the hand-drawn sketch, the line thickness indication symbol may also be drawn by a sketching tool 20.

Furthermore, the digital image processing apparatus according to the present invention may also recognize transparency indication symbols designated by the user with respect to each section of the hand-drawn sketch. Then, the digital image processing apparatus may change the transparency level of each section of the hand-drawn sketch to the transparency level designated by the transparency indication symbols, so as to store the processed hand-drawn sketch to a digital image. The transparency indication symbol corresponds to a predefined symbol, which is configured to be recognized by the digital image processing apparatus. And, just as the hand-drawn sketch, the transparency indication symbol may also be drawn by a sketching tool 20.

According to an exemplary embodiment of the present invention, the above-described color indication symbol, line thickness indication symbol, and transparency indication symbol may be expressed as a single integrated symbol. For example, when a circle is drawn as the integrated symbol and a designated color and a transparency level are marked therein, a hand-drawn sketch, which is designated by the integrated symbol, may be stored as a digital image having a line thickness that is equal to the diameter of the circle, a designated color, and a designated transparency level. More specifically, referring to FIG. 12, when the user uses a sketching tool so as to draw a circle, as an integrated symbol respective to the first segment 121, and when the user marks the inside of the circle with 'red' and '50', the digital image processing apparatus may change the first segment 121 to a segment having a line thickness corresponding to the diameter of the drawn circle, being colored with the color red, and having a transparency level of 50%, thereby storing the processed segment as a digital image.

Figure 13:
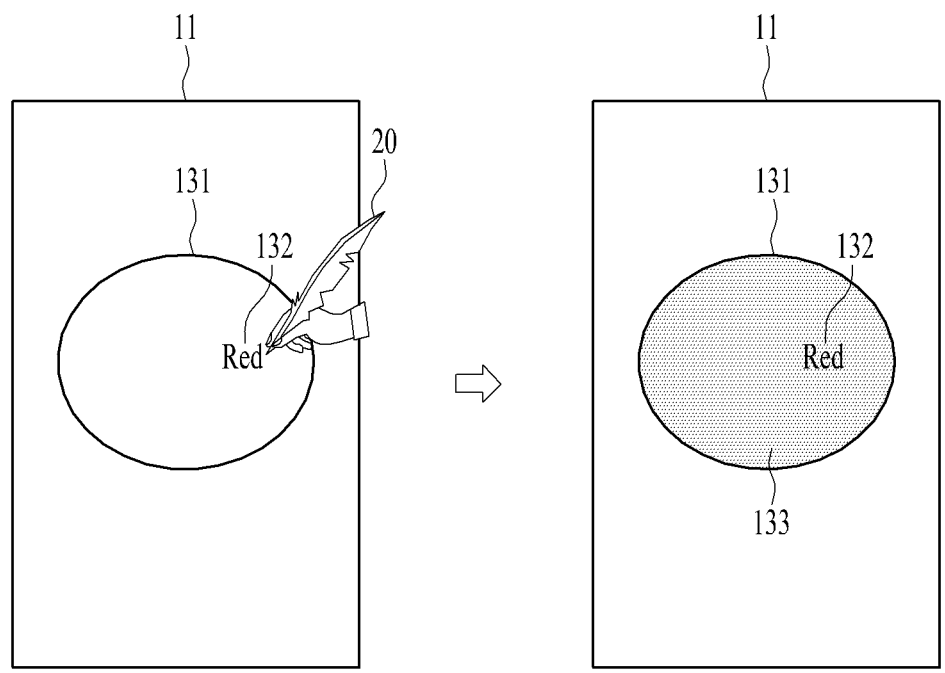
FIG. 13 illustrates a method for coloring the hand-drawn sketch according to the exemplary embodiment of the present invention.
Figure 13:
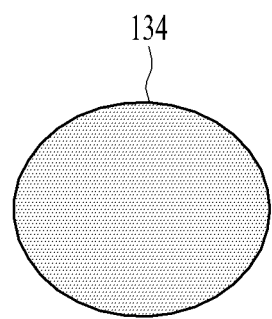

FIG. 13 illustrates a method for coloring the hand-drawn sketch according to the exemplary embodiment of the present invention. The digital image processing apparatus according to the present invention may recognize a coloring motion of the user on the hand-drawn sketch. And, then, the digital image processing apparatus may project the color designated by the coloring motion over the hand-drawn sketch. Additionally, the digital image processing apparatus may store the hand-drawn sketch along with the projected color. The coloring motion of the user corresponds to a predefined user motion, which is configured to be recognized by the digital image processing apparatus. Herein, the coloring motion may include a motion of inscribing a text or sign by using the sketching tool 20 and a coloring gesture performed by the user's hand.

For example, as shown in FIG. 13, the user may draw a hand-drawn sketch 131 including a circle on a physical object 11. Then, the user may inscribe 'red' 132 within the closed curved line (i.e., circle), as part of the coloring motion performed by the user. Thereafter, the digital image processing apparatus may sense the hand-drawn sketch and may recognize the coloring motion performed by the user, thereby displaying the inside of the circular curved line 133 of the hand-drawn sketch 131 to be colored with the color red. In storing the corresponding hand-drawn sketch as a digital image, the digital image processing apparatus may store the corresponding hand-drawn sketch as a digital image, wherein the digital image has the inside of the circular closed curved line 133 colored with the color red. In sensing and storing the hand-drawn sketch, the digital image processing apparatus may exclude the text and signs, which are inscribed by the coloring motion performed by the user, from the storage range.

Accordingly, by recognizing the coloring motion of the user and by displaying the corresponding color, the digital image processing apparatus may visually provide a designated color to the user. And, in storing the hand-drawn sketch, which is colored by the display, as a digital image, the colored hand-drawn sketch may be stored as a digital image. As a result, the user may store the colored digital image without having to be provided with a separate coloring tool.

Figure 14:
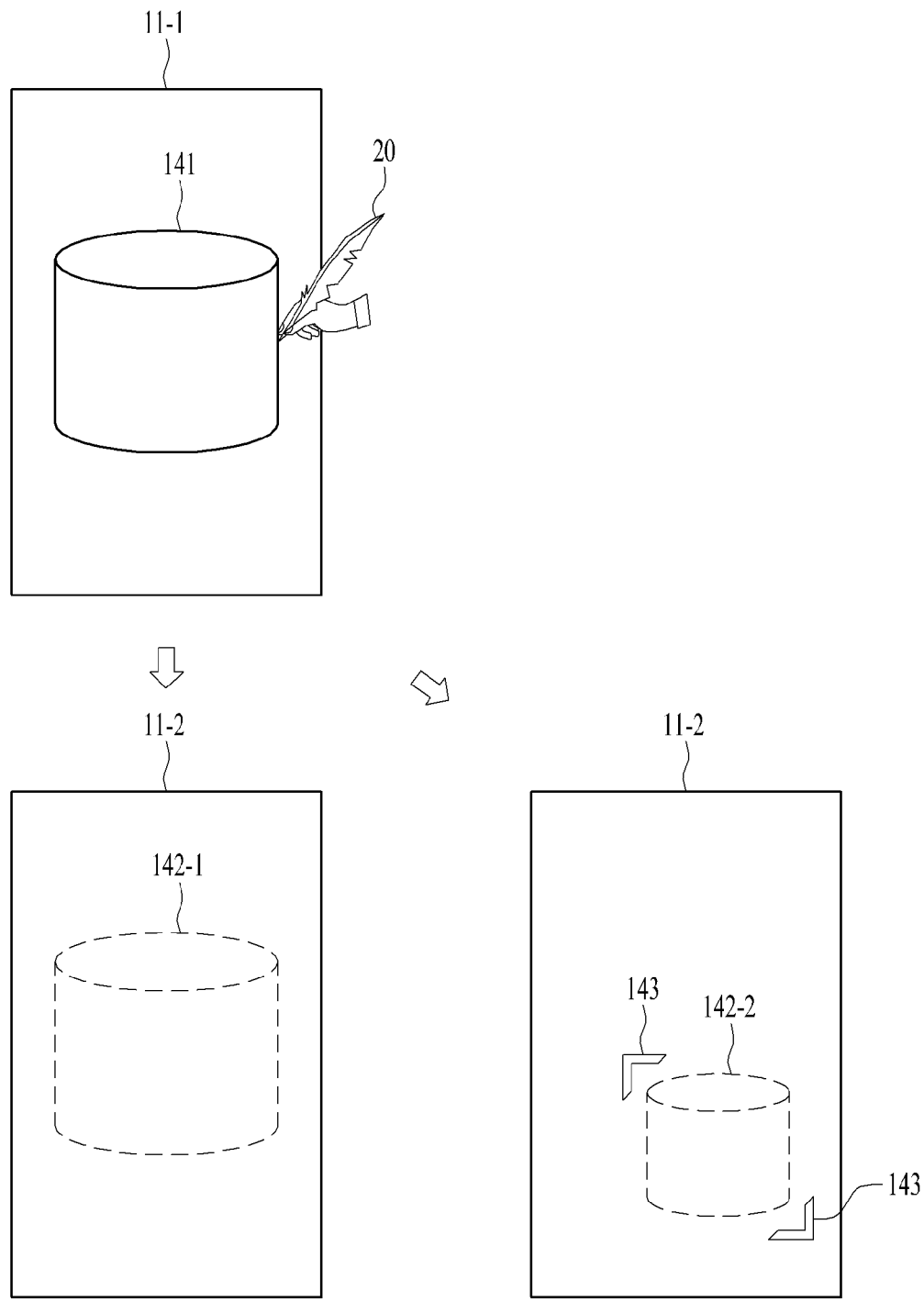
FIG. 14 illustrates a method for visualizing a virtual hand-drawn sketch according to the exemplary embodiment of the present invention.

FIG. 14 illustrates a method for visualizing a virtual hand-drawn sketch according to the exemplary embodiment of the present invention. The digital image processing apparatus according to the present invention may first scale the size of a digital image based upon the size of a physical object of a background that is being visualized, or based upon a specific area designated by the user within the background. Then, the digital image processing apparatus may visualize the scaled digital image as a virtual hand-drawn sketch.

The digital image processing apparatus according to the present invention may sense a hand-drawn sketch 141, which is drawn on a first physical object 11-1 by using a sketching tool 20, and may store the sensed hand-drawn sketch 141 as a digital image. When the user varies the time or place, and when the stored digital image is visualized on a second physical object 11-2, which is used as the background, the digital image processing apparatus may scale the size of the digital image based upon the size of the second physical object 11-2, or based upon the size of a user designated area. Thereafter, the digital image processing apparatus may visualize the scaled digital image as a virtual hand-drawn sketch.

When the scaling is performed based upon the size of the second physical object 11-2, the digital image processing apparatus may sense the size of the second physical object 11-2 and may, then, scale the digital image so that the virtual hand-drawn sketch 142-1 can be located within the second physical object 11-2, thereby visualizing the virtual hand-drawn sketch 142-1.

When the scaling is performed based upon the user designated area, the digital image processing apparatus may recognize an area designation symbol 143, which is marked on the second physical object 11-2 by the user. Herein, the area designation symbol 143 corresponds to a predefined symbol, which is configured to be recognized by the digital image processing apparatus. And, just as the hand-drawn sketch, the area designation symbol 143 may also be drawn by a sketching tool 20. In visualizing the digital image to the virtual hand-drawn sketch, the digital image processing apparatus may recognize the area designation symbol 143 and may, then, scale the size of the respective image data, so that the virtual hand-drawn sketch 142-2 can be located within the area designated by the area designation symbol 143, thereby visualizing the respective image data. More specifically, when a partial area of the physical object 11-2, which is used as the background for the visualization of the digital image, is designated by the area designation symbol 143, the digital image processing apparatus may scale a portion of the digital image corresponding to a partial area of the physical object 11-2, thereby scaling the virtual hand-drawn sketch 142-2.

In sensing and storing the hand-drawn sketch, the digital image processing apparatus may exclude the area designation symbol from the range of objects that are to be stored.

Figure 15:
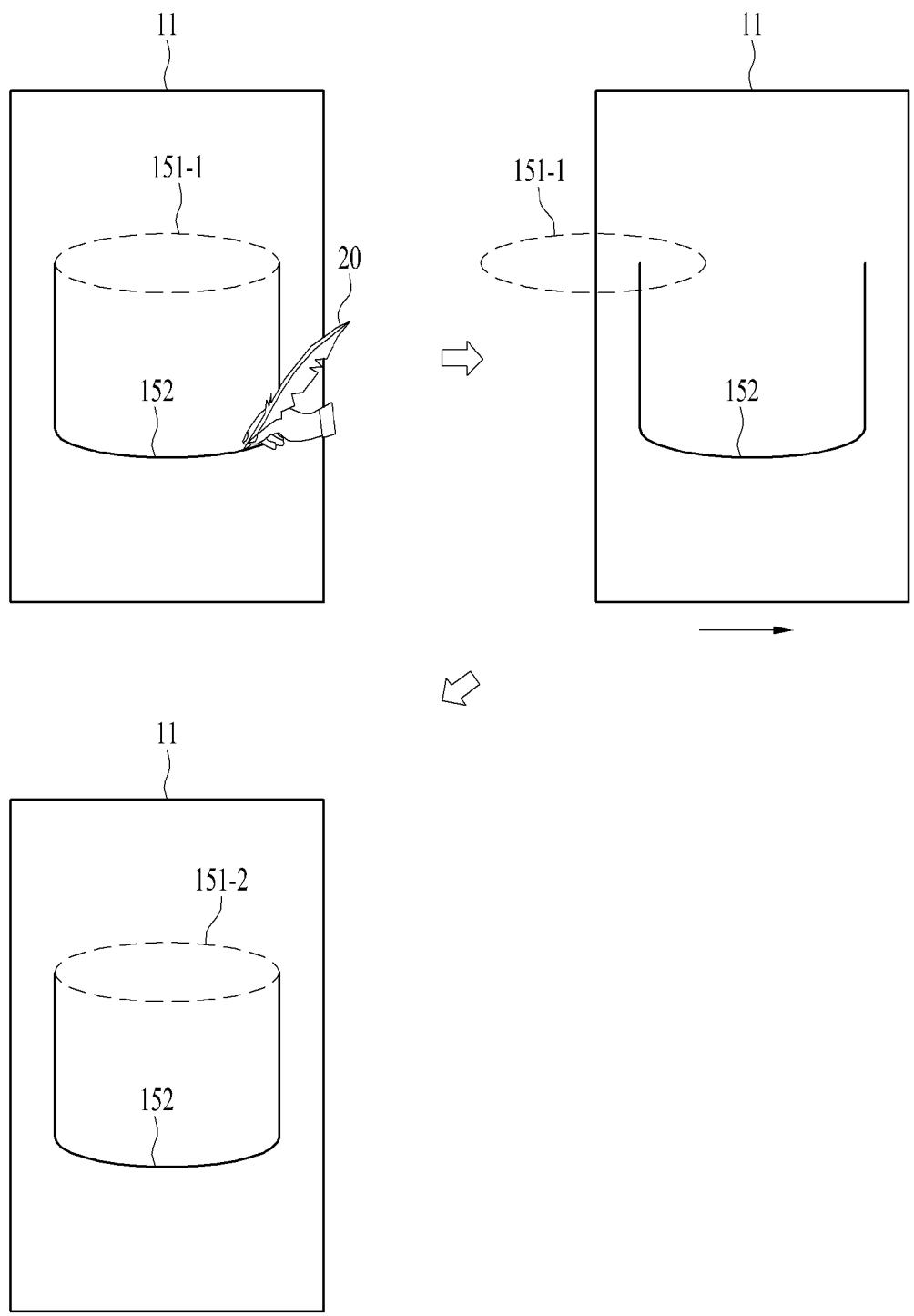
FIG. 15 illustrates a method for visualizing a digital image, which is visualized in the form of a virtual hand-drawn sketch, by shifting a position of the digital image according to the exemplary embodiment of the present invention.

FIG. 15 illustrates a method for visualizing a digital image, which is visualized in the form of a virtual hand-drawn sketch, by shifting a position of the digital image according to the exemplary embodiment of the present invention. When the position of a hand-drawn sketch, which is currently being drawn, is changed, the digital image processing apparatus may recognize the change in the position of the hand-drawn sketch and may re-position a virtual hand-drawn sketch, so that the position of the virtual hand-drawn sketch can correspond to the changed position of the hand-drawn sketch, thereby visualizing the virtual hand-drawn sketch.

For example, the digital image processing apparatus may visualize a stored digital image as a virtual hand-drawn sketch 151-1 on a physical object 11. In continuation of the virtual hand-drawn sketch 151-1, the user may draw a hand-drawn sketch 152 by using a sketching tool 20. At this point, if the position of the physical object 11 is changed, and if the hand-drawn sketch 152, which is currently being drawn, moves to another position, a mismatch may occur between a connection point of the visualized virtual hand-drawn sketch 151-1 and a connection point of the hand-drawn sketch 152. In this case, by changing a visualization area of the virtual hand-drawn sketch 151-1, so that the virtual hand-drawn sketch 151-1 can correspond to the hand-drawn sketch 152 drawn on the physical object 11, and by visualizing the processed virtual hand-drawn sketch 151-1, the digital image processing apparatus may display a newly positioned virtual hand-drawn sketch 151-2.

Accordingly, even if a physical object 11 including the hand-drawn sketch that is currently being drawn is moved or rotated, the user may refer to a virtual hand-drawn sketch, which is respectively being visualized so as to correspond to the moved or rotated physical object 11. And, then, the user may continue to drawn the hand-drawn sketch accordingly.

Figure 16:
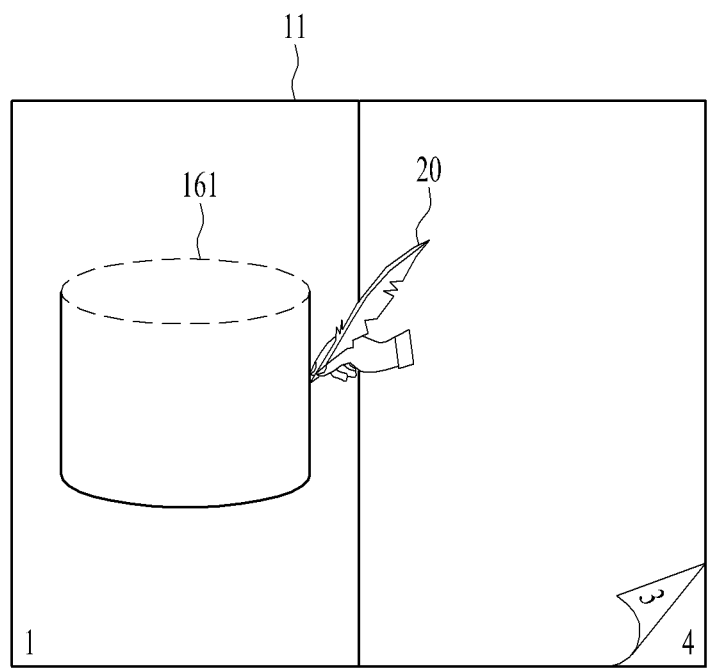
FIG. 16 illustrates a method for visualizing a digital image according to an exemplary embodiment of the present invention.
Figure 16:
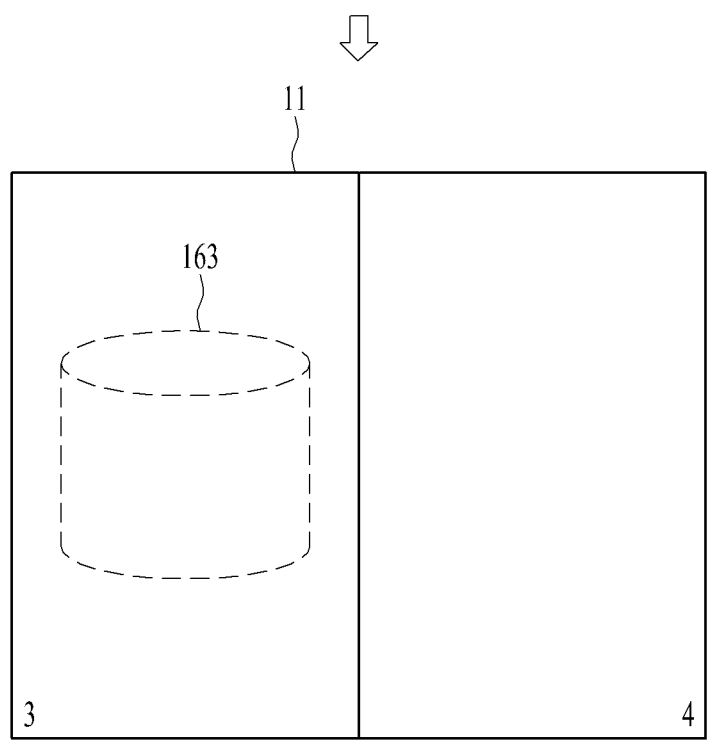

FIG. 16 illustrates a method for visualizing a digital image according to an exemplary embodiment of the present invention. When the user draws a second hand-drawn sketch in addition to the visualized first virtual hand-drawn sketch, the digital image processing apparatus according to the present invention may sense the newly added second hand-drawn sketch and may store the sensed second hand-drawn sketch as a second digital image. If the second hand-drawn sketch deviates from an image sensing area of the digital image processing apparatus within a predetermined period of time, the digital image processing apparatus may load the stored second digital image, so as to visualize the second digital image as a second virtual hand-drawn sketch. Herein, the predetermined period of time may correspond to a time period pre-determined by the user and may be substituted by a movement speed of the second hand-drawn sketch.

For example, the digital image processing apparatus may visualize the first digital image as a first virtual hand-drawn sketch 161 on a physical object. As shown in FIG. 16, the digital image processing apparatus may visualize a first virtual hand-drawn sketch 161 on Page 1 of the physical object 11, and the user may use a sketching tool 20 so as to draw a second hand-drawn sketch 162 on the corresponding page. The digital image processing apparatus may sense the second hand-drawn sketch 162 and may store the sensed second hand-drawn sketch 162 as a second digital image. When the user turns to a next page in order to perform additional sketching in continuation of the second hand-drawn sketch 162 on a new page, the digital image processing apparatus may integrate the stored first digital image and the stored second digital image on the next page, which corresponds to Page 3, so as to visualize the second virtual hand-drawn sketch 163.

Accordingly, by visualizing the contents of the drawing sketched by the user on a previous page, the digital image processing apparatus may provide the user with a sketch having continuity.

Figure 17:
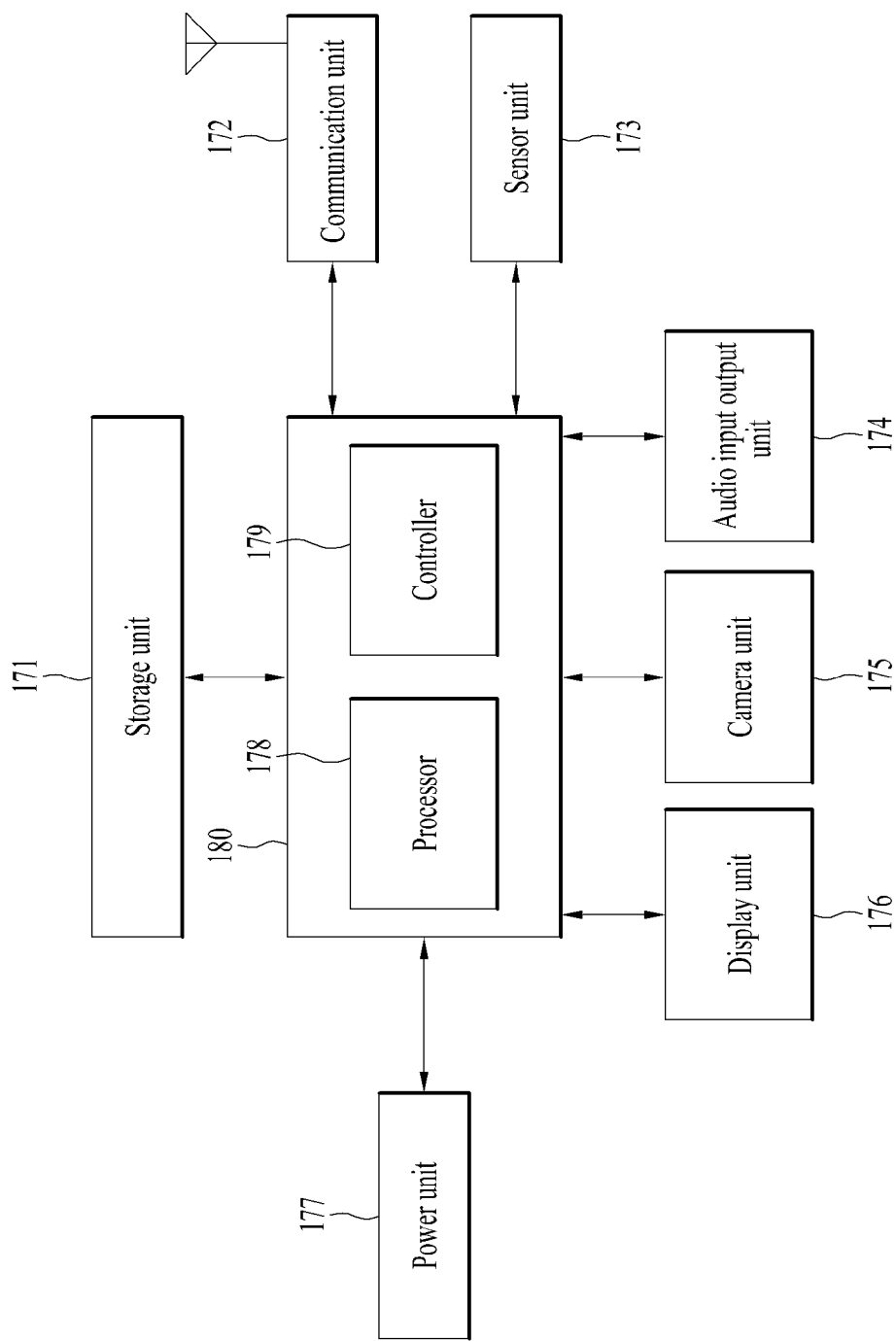
FIG. 17 illustrates a block view of an apparatus for processing a digital image according to an exemplary embodiment of the present invention.

FIG. 17 illustrates a block view of an apparatus for processing a digital image according to an exemplary embodiment of the present invention. Referring to FIG. 17, the digital image processing apparatus may include a storage unit 171, a communication unit 172, a sensor unit 173, an audio input output unit 174, a camera unit 175, a display unit 176, a power unit 177, a processor 178, and a controller 179.

The storage unit 171 may store diverse digital data, such as video data, audio data, still images, moving images, applications, and so on. The storage unit 171 represents a storage space for diverse digital data, such as a flash memory, a Hard Disk Drive (HDD), a Solid State Drive (SDD), and so on. The digital image processing apparatus according to the present invention may convert a sensed hand-drawn sketch to digital image and may, then, store the converted digital image in the storage unit 171. Additionally, the digital image processing apparatus may also load the digital image, which is stored in the storage unit 171, so as to visualize the loaded digital image as a virtual hand-drawn sketch. Furthermore, the storage unit 172 may store a rough sketch or additional information of the hand-drawn sketch, or a virtual guide image.

The communication unit 172 may use diverse protocols, so as to communicate with communication targets located outside of the digital image processing apparatus and to transmit and/or receive data. The communication unit 172 may access an external network via wired or wireless communication, thereby being capable of transmitting and/or receiving the digital data. The communication unit 172 may download a rough sketch or additional information of the hand-drawn sketch, or a virtual guide image from an external network or web.

The communication unit 172 may be optionally configured depending upon the design of the digital image processing apparatus.

The sensor unit 173 uses multiple sensors equipped on the digital image processing apparatus so as to be capable of delivering user input or an environment, which can be recognized by the digital image processing apparatus, to the controller 179. The sensor unit 173 may include multiple sensing means. According to an embodiment of the present invention, the multiple sensing units may include sensing units, such as a gravity sensor, a geomagnetism sensor, a motion sensor, a gyro sensor, an acceleration sensor, an inclination sensor, a brightness sensor, an altitude sensor, an odor sensor, a temperature sensor, a depth sensor, a pressure sensor, a banding sensor, an audio sensor, a video sensor, a Global Positioning System (GPS) sensor, a touch sensor, and so on. In the description of the present invention, the sensing unit may sense a hand-drawn sketch and may convert the hand-drawn sketch to a digital image. And, the sensing unit may also sense the position shift of the hand-drawn sketch, so as to provide information enabling the digital image processing apparatus to decide or change a visualization position at which the controller is to visualize the digital image to a virtual hand-drawn sketch. Furthermore, the sensing unit may also sense a change in the display pages of the physical object. The above-described sensors may be included in the digital image processing apparatus as separate elements, or at least one or more of the above-described sensors may be integrated to a single unit and included in the digital image processing apparatus).

The audio input output unit 174 may include an audio output means, such as a speaker, and an audio input means, such as a microphone. And, the audio input output unit 174 may perform audio output from the digital image processing apparatus and may also perform audio input to the digital image processing apparatus. The audio input output unit 174 may also be used as an audio sensor. The audio input output unit 174 may correspond to an optional structure in the digital image processing apparatus according to the present invention.

The camera unit 175 may perform functions of capturing still images and moving images. And, herein, the camera unit 175 may be selectively equipped in the digital image processing apparatus according to the exemplary embodiment of the present invention. The camera unit 175 may also be used as the above-described motion sensor or video sensor. The digital image processing apparatus may use the camera unit 175, so as to sense a hand-drawn sketch and to convert the hand-drawn sketch to a digital image. The camera unit 175 may also sense the position shift of the hand-drawn sketch, so as to provide information enabling the digital image processing apparatus to decide or change a visualization position at which the controller is to visualize the digital image as a virtual hand-drawn sketch. Furthermore, the camera unit 175 may also sense a change in the display pages of the physical object.

The display unit 176 may display a digital image on a display screen or may project a digital image on a physical object. The display unit 176 may include a display unit of a head mount display or a beam projector. The display unit 176 may visualize a stored digital image as a virtual hand-drawn sketch and may provide the visualized virtual hand-drawn sketch to the user. Also, as described above with reference to FIG. 13, depending upon the coloring motion of the user, the hand-drawn sketch may be visualized on the background by using the designated color. Furthermore, as described above with reference to FIG. 7, the display unit 176 may also provide a rough sketch of the hand-drawn sketch that is to be drawn by the user, additional information or a virtual guide image by visualizing the rough sketch, additional information, or virtual guide image.

The power unit 177 corresponds to a power source being connected to a battery provided inside the digital image processing apparatus or being connected to an external power, thereby supplying power to the digital image processing apparatus. Herein, the power unit 177 may correspond to an optional structure in the digital image processing apparatus according to the present invention.

The processor 178 may execute various applications that are stored in the storage unit 171. And, the processor 178 may also process data existing within the digital image processing apparatus.

The controller 179 may manage data transmission and reception of the above-described digital image processing apparatus.

Herein, the processor 178 and the controller 179 may be provided as a single chip 117, so as to collectively perform the above-described operations. In this case, the single chip 177 may hereinafter be referred to as the controller 179.

In the description of the present invention, as described above with reference to FIG. 2 to FIG. 16, the controller 179 may control the sensor unit 173 or the camera unit 175, so as to sense a hand-drawn sketch and to convert the sensed hand-drawn sketch to a digital image. Then, the controller 179 may control the digital image processing apparatus, so that the digital image processing apparatus can store the converted digital image in the storage unit 171. Furthermore, the controller 179 may also control the display unit 176, so that the stored digital image can be visualized as a virtual hand-drawn sketch. The controller 179 may also control the storage unit 171 and the communication unit 172, so as to provide the user with a rough sketch or additional information of the hand-drawn sketch or a virtual guide image. Additionally, the controller 179 may perform control operations for scaling the stored digital image, so that the scaled digital image can be visualized to a changed size. And, by recognizing the user's intention to erase all or a portion of the hand-drawn sketch, when storing the hand-drawn sketch as a digital image, the controller 179 may exclude the erased portion of the hand-drawn sketch from the storage range. Furthermore, among the plurality of stored digital images, the controller 179 may match the sketching characteristics of the digital images corresponding to the same hand-drawn sketch, so that the selected digital images have the same sketching characteristics. The controller 179 may recognize the Erase symbols, the color indication symbols, and the area designation symbols, and may control the respective unit so as to perform the functions corresponding to the recognized symbols.

As a block view of the digital image processing apparatus according to the embodiment of the present invention, the function blocks that are separately marked respectively represent elements of the digital image processing apparatus, which are logically differentiated and identified. Accordingly, the above-described elements of the digital image processing apparatus according to the present invention may each be mounted as single chip or as multiple chips, depending upon the design of the digital image processing apparatus.

Figure 18:
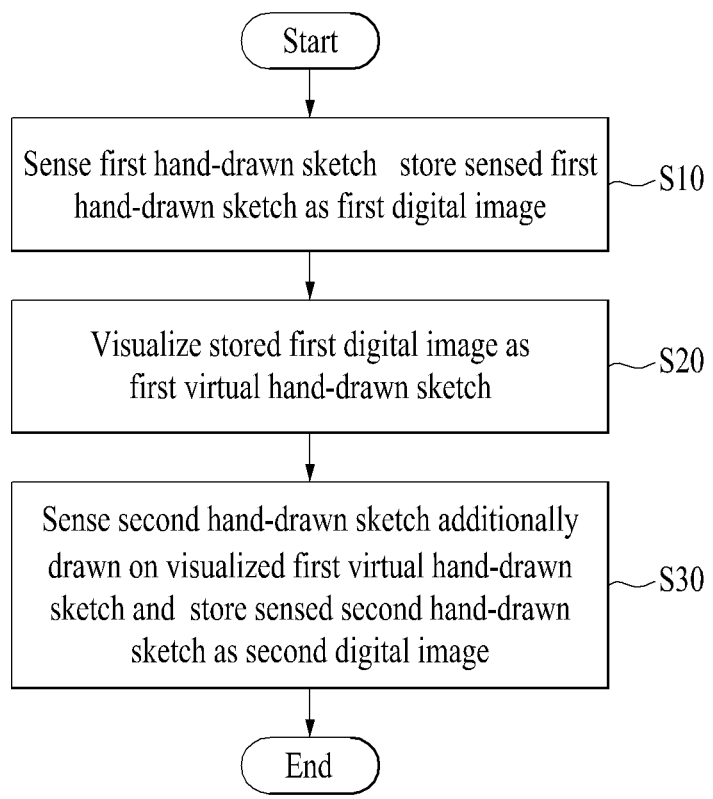
FIG. 18 illustrates a flow chart showing the process steps of a method for processing a digital image according to an exemplary embodiment of the present invention.

FIG. 18 illustrates a flow chart showing the process steps of a method for processing a digital image according to an exemplary embodiment of the present invention. The method for processing a digital image according to the present invention may sense a first hand-drawn sketch and may then store the sensed first hand-drawn sketch as a first digital image (S10). The hand-drawn sketch refers to a physical sketch created by a user via hand-drawing, which is expressed with a liquid or solid material. As described above with reference to FIG. 3, the method for processing a digital image may separately sense a background, on which a first hand-drawn sketch is drawn, and the first hand-drawn sketch. Herein, the first digital image may be generated by converting only the first hand-drawn sketch to a digital image. More specifically, the digital image processing apparatus may separately sense a physical object, on which the sketch is being drawn, and a hand-drawn sketch, which is drawn by the user, and may separately store the sensed physical object and the sensed hand-drawn sketch. The method for processing a digital image may sense the physical object, which is used as a background, before the user draws his hand-drawn sketch. The digital image processing method may sense an image, which is printed or hand-drawn on the physical object, and may differentiate the already-existing image from a hand-drawn sketch drawn by the user after the corresponding image.

The digital image processing method may load the first digital image and may visualize the loaded first digital image as a first virtual hand-drawn sketch (S20). The first virtual hand-drawn sketch refers to a virtual hand-drawn sketch that corresponds to a visualization of the first digital image that is performed by a projector or a display unit. After storing the first hand-drawn sketch, which is drawn by the user in the previous process step, the digital image processing method may provide the stored first digital image as a first virtual hand-drawn sketch without any restrictions in time or place.

Accordingly, the user may be capable of drawing a second hand-drawn sketch in addition to the first hand-drawn sketch, which has been previously drawn, while referring to the first virtual hand-drawn sketch. Therefore, the digital image processing method may ensure continuity between the two hand-drawn sketches.

The digital image processing method may visualize a digital image as a first virtual hand-drawn sketch at a desired time and a desired place. As described above with reference to FIG. 4, when storing the hand-drawn sketch, the digital image processing method may store any one of a color, a brightness level, and a pattern of the hand-drawn sketch along with the corresponding hand-drawn sketch. When visualizing the hand-drawn sketch, the digital image processing method may compare the color, brightness level, or pattern of the hand-drawn sketch, which is stored as described above, in a previous process step, with the color, brightness level, or pattern of the visualized background, so as to decide the color, brightness level, or pattern of the visualized virtual hand-drawn sketch. Based upon the background on which the virtual hand-drawn sketch is being visualized, the digital image processing method may decide a color, brightness level, or pattern of the visualized virtual hand-drawn sketch that can increase the visibility of the virtual hand-drawn sketch.

Additionally, as described above with reference to FIG. 14, based upon the size of the physical object, which is being used as the visualization background, or based upon a partial area designated by the user on the background, the digital image processing method according to the present invention may scale the size of a digital image and may visualize the scaled digital image as a virtual hand-drawn sketch. When the position of a hand-drawn sketch, which is currently being drawn, is changed, the digital image processing method recognizes such change in the position of the corresponding hand-drawn sketch. Then, the digital image processing method may re-position the virtual hand-drawn sketch, so that the position of the virtual hand-drawn sketch can match with the shifted position of the hand-drawn sketch, thereby visualizing the virtual hand-drawn sketch.

The digital image processing method may sense a second hand-drawn sketch, which is added to the visualized first virtual hand-drawn sketch and may, then, store the sensed second hand-drawn sketch as a second digital image (S30), As described above with reference to FIG. 11, when a first hand-drawn sketch and a second hand-drawn sketch have different sketching characteristics, and when both hand-drawn sketches co-exist, the digital image processing method according to the present invention may change the sketching characteristics of both hand-drawn sketches, so that the first hand-drawn sketch and the second hand-drawn sketch have the same sketching characteristics. Herein, the sketching characteristic may include at least one of a line thickness, texture, and color.

As described above with reference to FIG. 12, the digital image processing method may recognize color indication symbols designated by the user on each section of the hand-drawn sketch. Then, the digital image processing method may change each section of the hand-drawn sketch to colors indicated by each of the designated color indication symbols, thereby storing the converted hand-drawn sketch as a digital image. Herein, the color indication symbol corresponds to a predefined symbol, which is configured to be recognized by the digital image processing apparatus. And, just as the hand-drawn sketch, the color indication symbol may also be drawn by a sketching tool.

As described above with reference to FIG. 13, the digital image processing method may recognize a coloring motion of the user on the hand-drawn sketch. And, then, the digital image processing method may project the color designated by the coloring motion over the hand-drawn sketch. Additionally, the digital image processing method may store the hand-drawn sketch along with the projected color. The coloring motion of the user corresponds to a predefined user motion, which is configured to be recognized by the digital image processing method. Herein, the coloring motion may include a motion of inscribing a text or sign by using the sketching tool and a coloring gesture performed by the user's hand.

Figure 19:
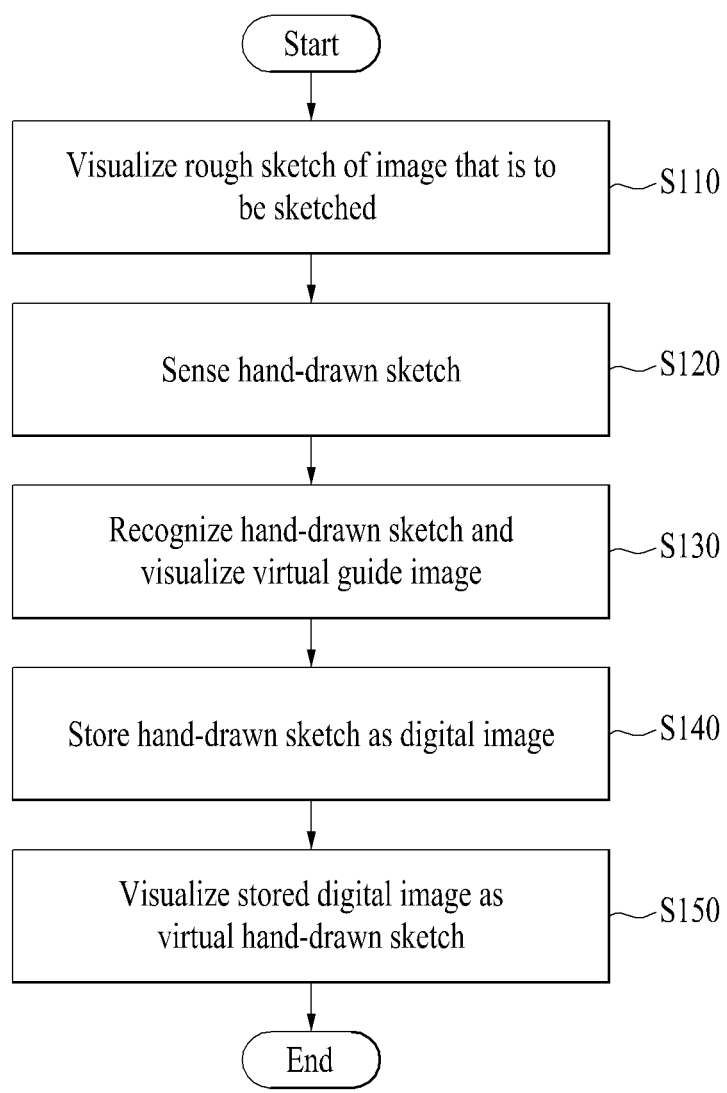
FIG. 19 illustrates a flow chart showing the process steps of a method for processing a digital image according to another exemplary embodiment of the present invention.

FIG. 19 illustrates a flow chart showing the process steps of a method for processing a digital image according to another exemplary embodiment of the present invention. The digital image processing method according to the present invention may visualize a rough sketch of an object that is to be sketched by the user (S110). As described above with reference to FIG. 6, the digital image processing method may provide the sketching object, which is selected by the user, by visualizing the selected sketching object in the form of a rough sketch. Depending upon the user's selection, the digital image processing method may load the rough sketch of the sketching object from an internal storage unit, an external storage unit, or a web storage unit, so as to visualize the rough sketch. The user may then use a sketching tool so as to draw a hand-drawn sketch by tracing the visualized rough sketch. Accordingly, even if the user has poor sketching skills, the user may be capable of completing his hand-drawn sketch based upon the visualized rough sketch.

The digital image processing method may sense the hand-drawn sketch (S120). Herein, the digital image processing method may sense the hand-drawn sketch, which is drawn on the physical object, by using a sensor unit to a camera, thereby converting the sensed hand-drawn sketch to a digital image.

The digital image processing method may recognize the hand-drawn sketch, so as to visualize a virtual guide image (S130). As described above with reference to FIG. 7, the digital image processing method may recognize the sensed and converted digital image, so as to visualize a virtual guide image corresponding to the hand-drawn sketch. Herein, the digital image processing method may additionally visualize color information and length information as additional information.

As described above with reference to FIG. 7, by performing the digital image processing method, the digital image processing apparatus may recognize the hand-drawn sketch of the user so as to visualize the virtual guide image. Herein, the virtual guide image refers to an image that allows the user to easily complete his sketch. Herein, the virtual guide image may include a continuity image of the hand-drawn sketch and an additional image providing a 3-dimensional view of the hand-drawn sketch.

Additionally, as described above with reference to FIG. 7, the digital image processing method may recognize a hand-drawn sketch drawn by the user and may additionally visualize color information respective to the corresponding hand-drawn sketch. Herein, the color information may be visualized in a text form respective to the corresponding color, or the color information may be visualized by displaying the corresponding color in a specific area. Moreover, the digital image processing apparatus may further include pattern information along with the color information by using the above-described digital image processing method.

Furthermore, as described above with reference to FIG. 7, the digital image processing method may recognize the hand-drawn sketch drawn by the user and may provide actual length information. Herein, the actual length information may be calculated from a distance between a physical object, on which the hand-drawn sketch is drawn, and from a length of the sensed hand-drawn sketch within the digital image. The digital image processing method may visualize the actual length information of each of the segments included in the hand-drawn sketch and may provide the visualized actual length information.

The digital image processing method may store the hand-drawn sketch as a digital image (S140). The digital image processing method may store the hand-drawn sketch, which is drawn in accordance with the visualized virtual guide image and the visualized additional information, as a digital image. Herein, the visualized virtual guide image and the visualized additional information may be excluded from the storage range. As a result, only the hand-drawn sketch drawn by the user may be stored. However, in an exceptional case, a color being displayed or projected by a coloring motion of the user may be stored along with the hand-drawn sketch.

The digital image processing method may visualize the stored digital image as a virtual hand-drawn sketch (S150). The digital image processing method may visualize the digital image, which is stored in the above-described process step, as a virtual hand-drawn sketch. And, based upon the visualized virtual hand-drawn sketch, the user may draw an additional sketch with continuity.

Eventually, when the user draws a hand-drawn sketch, the digital image processing method may assist the user by providing and displaying related images and information. And, when the user draws a hand-drawn sketch based upon the provided images and information, the digital image processing method may store the hand-drawn sketch as a digital image. Furthermore, by visualizing the stored digital image as a virtual hand-drawn sketch, the digital image processing method may provide a sketching environment without any restrictions in time or place.

As described above, the method and apparatus for processing a digital image may have the following advantages.

According to the present invention, a hand-drawn sketch, which is manually drawn by a user on a piece of paper, may be stored as a digital image. And, several hand-drawn sketches, which are drawn at different time points, may be stored as a single file. Additionally, according to the present invention, the hand-drawn sketch and the background of the hand-drawn sketch may be separated from one another, and only the hand-drawn sketch may be stored. Moreover, the hand-drawn sketch that is stored as a digital image may be visualized and provided.

Also, according to the embodiment of the present invention, hand-drawn sketches that are drawn at different magnification levels may be scaled and stored to have the same magnification. Additionally, a rough sketch of a drawing that is to be drawn by the user may be visualized and provided. According to the embodiment of the present invention, additional information on the corresponding hand-drawn sketch may be visualized on the hand-drawn sketch. Furthermore, the present invention may recognize the user's intention to erase a portion of the hand-drawn sketch and may selectively sense only a portion of the hand-drawn sketch and store the selected portion of the hand-drawn sketch as a digital image.

According to the embodiment of the present invention, multiple hand-drawn sketches each having a different sketching characteristic may be converted to hand-drawn sketches having the same sketching characteristics and may respectively be stored as digital images. Also, by using information additionally marked on the hand-drawn sketch, the present invention may change the sketching characteristics of the hand-drawn sketch in accordance with the corresponding information and may store the changed hand-drawn sketch. Moreover, according to the embodiment of the present invention, a color being projected to the hand-drawn sketch may be stored as a digital image along with the corresponding hand-drawn sketch. The present invention may also scale the stored digital image so that the corresponding digital image can correspond to the size of an area designated by the user. Furthermore, by recognizing the position of the hand-drawn sketch, the present invention may shift the position of a visualized virtual hand-drawn sketch.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for processing a digital image, comprising:
an image sensor unit configured to sense a hand-drawn sketch and to convert the sensed hand-drawn sketch to the digital image,
wherein the hand-drawn sketch corresponds to a physical sketch being expressed with a liquid or solid substance hand-drawn by a user;
an image storage unit configured to store the converted digital image;
an image display unit configured to visualize the stored digital image to a virtual hand-drawn sketch; and
a controller configured to perform steps of:
sensing a first hand-drawn sketch on a first sketching plane and storing the sensed first hand-drawn sketch as a first digital image;
detecting the first sketching plane is changed to a second sketching plane;

visualizing the stored first digital image as a first virtual hand-drawn sketch on the second sketching plane when the first hand-drawn sketch is not detected;

sensing a second hand drawn sketch being drawn on the second sketching plane, while the first virtual hand-drawn sketch is visualized on the second sketching plane; and storing the sensed second hand-drawn sketch as a second digital image;

recognizing the first hand-drawn sketch or the second hand-drawn sketch, and visualizing a virtual guide image, wherein the virtual guide image includes an extension line image of the first hand-drawn sketch or second hand-drawn sketch or an additional image providing a 3-dimensional view of the first hand-drawn sketch or second hand-drawn sketch.

2. The apparatus of claim 1, wherein the second digital image overlaps with the first digital image, or wherein the second digital image is stored in a separate layer other than that of the first digital image.

3. The apparatus of claim 1, wherein the step of visualizing the first digital image as the first virtual hand-drawn sketch includes an operation of deciding a color, a brightness, or a pattern of the first virtual hand-drawn sketch, so that a background and the first virtual hand-drawn sketch can be differentiated from one another, based upon at least one of a color, a brightness, and a pattern of the background, on which the first virtual hand-drawn sketch is visualized.

4. The apparatus of claim 1, wherein, in the step of storing the second digital image, the second digital image is scaled based upon a size of the stored first digital image, and wherein the scaled second digital image is stored.

5. The apparatus of claim 1, wherein the apparatus for processing the digital image further comprises a step of visualizing a rough sketch of an object that is to be sketched by the user.

6. The apparatus of claim 5, wherein the apparatus for processing the digital image visualizes the first virtual hand-drawn sketch and the rough sketch by using a color, a brightness level, or a pattern, each being differentiated from one another.

7. The apparatus of claim 1, wherein the apparatus for processing the digital image further comprises an operation of recognizing the first hand-drawn sketch or the second hand-drawn sketch, thereby visualizing additional information, wherein the additional information includes at least one of color information and pattern information corresponding to the first hand-drawn sketch or the second hand-drawn sketch and length information of the first hand-drawn sketch or the second hand-drawn sketch.

8. The apparatus of claim 1, wherein, when the apparatus for processing the digital image respectively stores the sensed first hand-drawn sketch and the sensed second hand-drawn sketch as the first digital image and the second digital image, the user's intention to erase a partial section of the first hand-drawn sketch or the second hand-drawn sketch is recognized, and, even if a residue of the first hand-drawn sketch and the second hand-drawn sketch remains in the partial section, the partial section is excluded from being stored in the image storage unit.

9. The apparatus of claim 8, wherein the user's intention to erase the partial section of the first hand-drawn sketch or the second hand-drawn sketch is recognized by at least one of:

a motion of covering the partial section of the first hand-drawn sketch or the second hand-drawn sketch with a liquid or solid substance; and a motion of removing the liquid or solid substance remaining from the hand-drawing of the user respective to the partial section of the first hand-drawn sketch or the second hand-drawn sketch.

10. The apparatus of claim 8, wherein the user's intention to erase the partial section of the first hand-drawn sketch or the second hand-drawn sketch is recognized by an Erase symbol, wherein the Erase symbol is additionally drawn on the partial section of the first hand-drawn sketch or the second hand-drawn sketch.

11. The apparatus of claim 8, wherein the user's intention to erase the partial section of the first hand-drawn sketch or the second hand-drawn sketch is recognized by at least one of:

a motion of selecting a visualized Erase button; and a motion of selecting the partial section of the first hand-drawn sketch or the second hand-drawn sketch.

12. The apparatus of claim 10, wherein a hand-drawn sketch being newly drawn on the partial section of the first hand-drawn sketch or the second hand-drawn sketch, after the recognition of the user's intention to erase the portion of the hand-drawn sketches, is included as an object that is to be stored.

13. The apparatus of claim 1, wherein, in the step of storing the sensed second hand-drawn sketch as the second digital image, when a sketching characteristic of the first hand-drawn sketch is different from a sketching characteristic of the second hand-drawn sketch, the sketching characteristics of the first and second hand-drawn sketches are changed to the same sketching characteristics and stored accordingly, and wherein the sketching characteristic includes at least one of line thickness, texture, and color.

14. The apparatus of claim 1, wherein at least one of color indication symbols, line thickness indication symbols, and transparency indication symbols, being marked on each section of the first hand-drawn sketch or the second hand-drawn sketch, are recognized, and wherein each section is changed to have the color, line thickness, and transparency level indicated by each symbol, thereby storing the processed hand-drawn sketch as the digital image.

15. The apparatus of claim 1, wherein the apparatus for processing the digital image further performs the steps of:

recognizing a coloring motion performed by the user over the first hand-drawn sketch or the second hand-drawn sketch;

projecting a color designated by the coloring motion over the first hand-drawn sketch or the second hand-drawn sketch; and storing the first hand-drawn sketch or the second hand-drawn sketch along with the projected color.

16. The apparatus of claim 1, wherein, in the step of visualizing the first digital image, a size of the first digital image is first scaled, based upon a size of a background on which the first virtual hand-drawn sketch is visualized, or based upon a section designated by the user over the background, and the scaled first digital image is visualized as the first virtual hand-drawn sketch.

17. The apparatus of claim 1, wherein, when a position of the second hand-drawn sketch is changed, the apparatus further performs steps of:

recognizing the changed position of the second hand-drawn sketch, and visualizing the first virtual hand-drawn sketch on the position corresponding to the recognized position of the second hand-drawn sketch.

18. The apparatus of claim 1, wherein, when the second hand-drawn sketch deviates from a sensing area of the image sensor unit within a predetermined period of time, the apparatus further performs steps of:
loading the stored second digital image, and
visualizing the loaded second digital image as a second virtual hand-drawn sketch.

19. A method for processing a digital image, comprising:
sensing a first hand-drawn sketch on a first sketching plane and storing the sensed first hand-drawn sketch as a first digital image;
detecting the first sketching plane is changed to a second sketching plane;
visualizing the stored first digital image as a first virtual hand-drawn sketch on the second sketching plane when the first hand-drawn sketch is not detected;
sensing a second hand-drawn sketch being drawn on the second sketching plane, while the first virtual hand-drawn sketch is visualized on the second sketching plane;
storing the sensed second hand-drawn sketch as a second digital image;
recognizing the first hand-drawn sketch or the second hand-drawn sketch; and
visualizing a virtual guide image,
wherein each of the first hand-drawn sketch and the second hand-drawn sketch corresponds to a physical sketch being expressed with a liquid or solid substance hand-drawn by a user, and
wherein the virtual guide image includes an extension line image of the first hand-drawn sketch or second hand-drawn sketch or an additional image providing a 3-dimensional view of the first hand-drawn sketch or second hand-drawn sketch.

20. The apparatus of claim 1, wherein the first sketching plane and the second sketching are mutually independent in time and space.

21. The apparatus of claim 1, wherein the second digital image includes the first digital image and the sensed second hand-drawn sketch.

22. The apparatus of claim 1, wherein the first digital image is stored in a first layer and the second digital image is stored in a second layer of a single file.

* * * * *